(12) United States Patent
Jiaqing et al.

(10) Patent No.: US 10,237,868 B2
(45) Date of Patent: Mar. 19, 2019

(54) SIGNAL SENDING METHOD, RECEIVING METHOD AND DEVICE

(71) Applicant: China Academy of Telecommunications Technology, Beijing (CN)

(72) Inventors: Wang Jiaqing, Beijing (CN); Pan Xueming, Beijing (CN); Xu Weijie, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 15 days.

(21) Appl. No.: 15/547,474

(22) PCT Filed: Jan. 26, 2016

(86) PCT No.: PCT/CN2016/072205
§ 371 (c)(1),
(2) Date: Jul. 28, 2017

(87) PCT Pub. No.: WO2016/119687
PCT Pub. Date: Aug. 4, 2016

(65) Prior Publication Data
US 2018/0035429 A1 Feb. 1, 2018

(30) Foreign Application Priority Data
Jan. 30, 2015 (CN) .......................... 2015 1 0052272

(51) Int. Cl.
*H04L 5/00* (2006.01)
*H04W 72/04* (2009.01)

(52) U.S. Cl.
CPC ....... *H04W 72/0446* (2013.01); *H04L 5/0053* (2013.01); *H04W 72/0453* (2013.01); *H04L 5/001* (2013.01)

(58) Field of Classification Search
CPC .......... H04W 72/0446; H04W 72/0453; H04L 5/0053; H04L 5/001
See application file for complete search history.

(56) References Cited

U.S. PATENT DOCUMENTS

2003/0037113 A1* 2/2003 Petrovykh ............... H04L 41/18
709/205
2015/0222401 A1* 8/2015 Xu ......................... H04W 8/005
370/329

FOREIGN PATENT DOCUMENTS

| CN | 102017462 A | 4/2011 |
| CN | 102065123 A | 5/2011 |

(Continued)

OTHER PUBLICATIONS

3GPP TSG RAN WG1 Meeting #80 R1-150110, "Design of load-based LBT for LAA", CATT, Athens, Greece, Feb. 9-13, 2015, (pp. 4).

(Continued)

*Primary Examiner* — Sharad Rampuria
(74) *Attorney, Agent, or Firm* — Foley & Lardner LLP

(57) ABSTRACT

Disclosed are a signal sending method, and a receiving method and device. The signal sending method comprises: according to the size of a time-domain resource which has already been acquired or which may be acquired in a target subframe, generating a sending signal matching the size of the time-domain resource; and after the time-domain resource in the target subframe is acquired, sending the sending signal matching the acquired time-domain resource in the target subframe. By means of the technical solution provided in the embodiments of the present invention, signal transmission over an incomplete subframe is realized, thereby improving the transmission efficiency.

19 Claims, 3 Drawing Sheets

(56) References Cited

FOREIGN PATENT DOCUMENTS

| CN | 103686691 A | 3/2014 |
| CN | 104106231 A | 10/2014 |
| EP | 2 106 057 A1 | 9/2009 |
| WO | WO-2013/119158 A1 | 8/2013 |

OTHER PUBLICATIONS

3GPP TSG RAN WG1 Meeting #82, R-154541, "On discontinuous transmission bursts for LAA", ITL, Beijing, China, Aug. 24-28, 2015, (pp. 6).

* cited by examiner

SIGNAL SENDING METHOD, RECEIVING METHOD AND DEVICE

This application is a US National Stage of International Application No. PCT/CN2016/072205, filed on Jan. 26, 2016, designating the United States and claiming priority to Chinese Patent Application No. 201510052272.0, filed with the Chinese Patent Office on Jan. 30, 2015 and entitled "A method and device for transmitting a signal, and a method and device for receiving a signal", the content of each of which is hereby incorporated by reference in its entirety.

FIELD

The present disclosure relates to the field of wireless communications, and particularly to a method and device for transmitting a signal, and a method and device for receiving a signal.

BACKGROUND

As there is a constantly growing amount of mobile data traffic, spectrum resources become increasingly insufficient, and a demand for the amount of traffic may not have been satisfied by deploying a network and transmitting traffic only over spectrum resources in licensed frequency bands. In view of this, transmissions in a Long Term Evolution (LTE) system may be deployed over spectrum resources in an unlicensed frequency band (which is referred to as Unlicensed LTE, or simply U-LTE or LTE-U) to improve user experience and extend a coverage area.

Spectrum resources in an unlicensed frequency band have not been planned for any particular application system, but may be shared by various wireless communication systems (e.g., Bluetooth, Wireless-Fidelity (WiFi), etc.), where the various systems access the shared spectrum resources in the unlicensed frequency band by preempting the resources. Ongoing researches are focused on the coexistence of LTE-U schemes deployed by different operators, and on the coexistence of LTE-U schemes and wireless communication systems such as WiFi. The $3^{rd}$ Generation Partnership Project (3GPP) requires that fair coexistence of LTE-U schemes and wireless communication systems such as WiFi should be guaranteed, and the spectrum resources in an unlicensed frequency band shall operate as secondary carriers with the assistance of a primary carrier in an licensed frequency band. Listen Before Talk (LBT) has been widely accepted in the industry as a general mean for LTE-U contention access.

In order to provide a flexible, fair and adaptive channel access mechanism, it is required in the European Telecommunications Standards Institute (ETSI) standards that the LBT technology shall operate in the unlicensed frequency bands of 5150-5350 MHz and 5470-5725 MHz. In an LBT process, which is similar to the WiFi Carrier Sense Multiple Access with Collision Avoidance (CSMA/CA) mechanism, before accessing a channel, each device needs to check whether a signal is currently being transmitted in the channel or not through Clear Channel Assessment (CCA) to determine whether the channel is occupied. Devices accessing spectrum resources in an unlicensed frequency band are categorized by the ETSI standards into frame-based and load-based devices, which correspond to two access mechanisms, respectively: the Frame Based Equipment (FPE) and the Load Based Equipment (LBE).

In the LBE channel access mechanism, extended CCA detection needs to be made before the channel is accessed, that is, a random factor N is generated, and neither will channel be accessed, nor will data transmission be initiated, until the channel has been idle for a period of time which is N times a period of time for CCA. As can be apparent, for continuous transmission each time, both the period of time for which the channel is occupied and the start point where the transmission is started are variable in the LBE channel access mechanism.

As currently required in the 3GPP sessions, LTE transmission in a licensed frequency band, and LTE-U transmission in an unlicensed frequency band need to be aligned in time, while the start point of time when LTE-U signal transmission is started may be at any position in some sub-frame due to factors such as LBT contention access or a period of time for preparing a radio frequency, therefore, a partial sub-frame, i.e., a physical resource with a shorter length of time than the length of a normal sub-frame, may be transmitted during LTE-U transmission. If no signal is transmitted by an LTE-U device in the partial sub-frame during contention access, then the sub-frame would be preempted by another device in the case of drastic contention. Furthermore the longest period of time for which a station transmits continuously is specified as 4 ms in the regulation for unlicensed frequency bands in Japan, and regulations in different regions need to be followed by the 3GPP standard to be set up. Accordingly if the longest period of time for continuous transmission in LTE-U is 4 ms, and no signal is transmitted in two partial sub-frames (i.e., a start sub-frame and an end sub-frame), then the efficiency of LTE-U transmission will be degraded by a factor of 25%, so it is necessary to transmit a signal in a partial sub-frame in an unlicensed frequency band.

However there has been absent so far a solution to transmission of a signal in a partial sub-frame in an unlicensed frequency band.

SUMMARY

An object of the disclosure is to provide a method and device for transmitting a signal, and a method and device for receiving a signal so as to address the problem of how to transmit a signal in a partial sub-frame in an unlicensed frequency band.

The object of the disclosure is attained by the following technical solutions.

A method for transmitting a signal includes:

generating a transmission signal matching a time-domain resource size obtained or to be possibly obtained in a target sub-frame, according to the time-domain resource size; and transmitting the transmission signal, that matches an obtained time-domain resource in the target sub-frame, after the time-frequency resource in the target sub-frame is obtained.

In one aspect, generating a transmission signal matching a time-domain resource size obtained or to be possibly obtained in a target sub-frame, according to the time-domain resource size includes:

before the time-frequency resource in the target sub-frame is obtained, determining a transport block size matching the time-domain resource size to be possibly obtained in the target sub-frame, according to the time-domain resource size to be possibly obtained in the target sub-frame; and generating the transmission signal matching the time-domain resource size to be possibly obtained in the target sub-frame according to the transport block size matching the time-domain resource size to be possibly obtained in the target sub-frame.

In a first possible implementation of the first aspect, before determining a transport block size matching the time-domain resource size to be possibly obtained in the target sub-frame, according to the time-domain resource size to be possibly obtained in the target sub-frame, the method further includes:

determining a transport block size index and a frequency-domain resource corresponding to the transmission signal in the target sub-frame; and determining a transport block size matching the time-domain resource size to be possibly obtained in the target sub-frame, according to the time-domain resource size to be possibly obtained in the target sub-frame, includes:

adjusting the size of the frequency-domain resource according to an adjustment coefficient corresponding to a level of the time-domain resource size to be possibly obtained in the target sub-frame, to obtain a frequency-domain resource size corresponding to the level; and determining a transport block size matching the time-domain resource size to be possibly obtained in the target sub-frame at the level according to the transport block size index and the frequency-domain resource size corresponding to the level.

In a second possible implementation of the first aspect, before determining a transport block size matching the time-domain resource size to be possibly obtained in the target sub-frame, according to the time-domain resource size to be possibly obtained in the target sub-frame, the method further includes:

determining a transport block size index and a frequency-domain resource corresponding to the transmission signal in the target sub-frame; and determining a transport block size matching the time-domain resource size to be possibly obtained in the target sub-frame, according to the time-domain resource size to be possibly obtained in the target sub-frame, includes:

adjusting the transport block size index according to an adjustment coefficient corresponding to a level of the time-domain resource size to be possibly obtained in the target sub-frame, to obtain a transport block size index corresponding to the level; and determining a transport block size matching the time-domain resource size to be possibly obtained in the target sub-frame at the level according to the size of the frequency-domain resource, and the transport block size index corresponding to the level; or adjusting transport block size index and the size of the frequency-domain resource according to an adjustment coefficient corresponding to a level of the time-domain resource size to be possibly obtained in the target sub-frame, to obtain a transport block size index and a frequency-domain resource size corresponding to the levels; and determining a transport block size matching the time-domain resource size to be possibly obtained in the target sub-frame at the level according to the transport block size index and the frequency-domain resource size corresponding to the level.

In a third possible implementation of the first aspect, before determining a transport block size matching the time-domain resource size to be possibly obtained in the target sub-frame, according to the time-domain resource size to be possibly obtained in the target sub-frame, the method further includes:

determining a transport block size index and a frequency-domain resource corresponding to the transmission signal in the target sub-frame; and determining a candidate transport block size according to the transport block size index and the size of the frequency-domain resource; and determining a transport block size matching the time-domain resource size to be possibly obtained in the target sub-frame, according to the time-domain resource size to be possibly obtained in the target sub-frame includes:

determining the transport block size matching a time-domain resource size to be possibly obtained in the target sub-frame at a level according to an adjustment coefficient corresponding to the level of the time-domain resource size to be possibly obtained in the target sub-frame and the candidate transport block size.

In a fourth possible implementation of the first aspect, before determining a transport block size matching the time-domain resource size to be possibly obtained in the target sub-frame, according to the time-domain resource size to be possibly obtained in the target sub-frame, the method further includes:

determining a transport block size index and a frequency-domain resource corresponding to the transmission signal in the target sub-frame; and determining a candidate transport block size according to the transport block size index and the size of the frequency-domain resource; and determining a transport block size matching the time-domain resource size to be possibly obtained in the target sub-frame, according to the time-domain resource size to be possibly obtained in the target sub-frame includes:

determining a transport block size matching the time-domain resource size to be possibly obtained in the target sub-frame, according to the time-domain resource size to be possibly obtained in the target sub-frame and the candidate transport block size.

In a fifth possible implementation of the first aspect, before determining a transport block size matching the time-domain resource size to be possibly obtained in the target sub-frame, according to the time-domain resource size to be possibly obtained in the target sub-frame, the method further includes:

determining a transport block size index and a frequency-domain resource corresponding to the transmission signal in the target sub-frame; and determining a transport block size matching the time-domain resource size to be possibly obtained in the target sub-frame, according to the time-domain resource size to be possibly obtained in the target sub-frame includes:

adjusting the size of the frequency-domain resource according to the time-domain resource size to be possibly obtained in the target sub-frame; and determining the transport block size matching the time-domain resource size to be possibly obtained in the target sub-frame according to the transport block size index and the adjusted size of the frequency-domain resource; or adjusting the transport block size index according to the time-domain resource size to be possibly obtained in the target sub-frame; and determining the transport block size matching the time-domain resource size to be possibly obtained in the target sub-frame according to the size of the frequency-domain resource and the adjusted transport block size index; or adjusting the transport block size index and the size of the frequency-domain resource according to the respective time-domain resource size to be possibly obtained in the target sub-frame; and determining the transport block size matching the time-domain resource size to be possibly obtained in the target sub-frame according to the adjusted transport block size index and the size of the frequency-domain resource.

In another aspect, generating the transmission signal matching the time-domain resource size obtained or to be possibly obtained in the target sub-frame, according to the time-domain resource size includes:

after the time-frequency resource in the target sub-frame is obtained, generating the transmission signal matching the time-domain resource size obtained in the target sub-frame, according to the time-domain resource size obtained in the target sub-frame.

In a first possible implementation of the second aspect, before generating the transmission signal matching the time-domain resource size obtained in the target sub-frame, according to the time-domain resource size obtained in the target sub-frame, the method further includes:

determining a transport block size index and a frequency-domain resource corresponding to the transmission signal in the target sub-frame; and generating the transmission signal matching the time-domain resource size obtained in the target sub-frame, according to the time-domain resource size obtained in the target sub-frame, includes:

adjusting the size of the frequency-domain resource according to an adjustment coefficient corresponding to a level of the time-domain resource size obtained in the target sub-frame, and determining a transport block size matching the obtained time-domain resource size according to the transport block size index and the adjusted size of the frequency-domain resource; or adjusting the transport block size index according to an adjustment coefficient corresponding to a level of the time-domain resource size obtained in the target sub-frame, and determining a transport block size matching the obtained time-domain resource size according to the adjusted transport block size index and the size of the frequency-domain resource; or adjusting the transport block size index, and the size of the frequency-domain resource according to an adjustment coefficient corresponding to a level of the time-domain resource size obtained in the target sub-frame, and determining a transport block size matching the obtained time-domain resource size according to the adjusted transport block size index and the adjusted size of the frequency-domain resource; and generating the transmission signal matching the time-domain resource size obtained in the target sub-frame according to the transport block size matching the time-domain resource size obtained in the target sub-frame.

In a second possible implementation of the second aspect, before generating the transmission signal matching the time-domain resource size obtained in the target sub-frame, according to the time-domain resource size obtained in the target sub-frame, the method further includes:

determining a transport block size index and a frequency-domain resource corresponding to the transmission signal in the target sub-frame; and determining a candidate transport block size according to the transport block size index and the frequency-domain resource;

generating the transmission signal matching the time-domain resource size obtained in the target sub-frame, according to the time-domain resource size obtained in the target sub-frame includes:

determining a transport block size matching the obtained time-domain resource size according to an adjustment coefficient corresponding to a level of the time-domain resource size obtained in the target sub-frame and the candidate transport block size; and generating the transmission signal matching the time-domain resource size obtained in the target sub-frame according to the transport block size matching the time-domain resource size obtained in the target sub-frame.

In a third possible implementation of the second aspect, before generating the transmission signal matching the time-domain resource size obtained in the target sub-frame, according to the time-domain resource size obtained in the target sub-frame, the method further includes:

determining a transport block size index and a frequency-domain resource corresponding to the transmission signal in the target sub-frame; and determining a candidate transport block size according to the transport block size index and the frequency-domain resource; and generating the transmission signal matching the time-domain resource size obtained in the target sub-frame, according to the time-domain resource size obtained in the target sub-frame includes:

determining a transport block size matching the time-domain resource size obtained in the target sub-frame according to the time-domain resource size obtained in the target sub-frame and the candidate transport block size; and generating the transmission signal matching the time-domain resource size obtained in the target sub-frame according to the transport block size matching the time-domain resource size obtained in the target sub-frame.

In a fourth possible implementation of the second aspect, before generating the transmission signal matching the time-domain resource size obtained in the target sub-frame, according to the time-domain resource size obtained in the target sub-frame, the method further includes:

determining a transport block size index and a frequency-domain resource corresponding to the transmission signal in the target sub-frame; and generating the transmission signal matching the time-domain resource size obtained in the target sub-frame, according to the time-domain resource size obtained in the target sub-frame includes:

adjusting the size of the frequency-domain resource according to the time-domain resource size obtained in the target sub-frame, and determining a transport block size matching the time-domain resource size obtained in the target sub-frame according to the transport block size index and the adjusted size of the frequency-domain resource; or adjusting the transport block size index according to the time-domain resource size obtained in the target sub-frame, and determining transport block size matching the time-domain resource size obtained in the target sub-frame according to the size of the frequency-domain resource and the adjusted transport block size index; or adjusting the transport block size index and the size of the frequency-domain resource according to the time-domain resource size obtained in the target sub-frame, and determining a transport block size matching the time-domain resource size obtained in the target sub-frame according to the adjusted transport block size index and the size of the frequency-domain resource; and generating the transmission signal matching the time-domain resource size obtained in the target sub-frame according to the transport block size matching the time-domain resource size obtained in the target sub-frame.

In a fifth possible implementation of the second aspect, before generating the transmission signal matching the time-domain resource size obtained in the target sub-frame, according to the time-domain resource size obtained in the target sub-frame, the method further includes:

determining a transport block size index and a candidate frequency-domain resource corresponding to the transmission signal in the target sub-frame; and determining a transport block size according to the transport block size index and the candidate frequency-domain resource; and generating the transmission signal matching the time-domain resource size obtained in the target sub-frame, according to the time-domain resource size obtained in the target sub-frame includes:

determining a frequency-domain resource matching the time-domain resource size obtained in the target sub-frame according to the time-domain resource size obtained in the target sub-frame and the candidate frequency-domain resource; and generating the transmission signal matching the time-domain resource size obtained in the target sub-frame according to the frequency-domain resource matching the time-domain resource size obtained in the target sub-frame, and the transport block size.

According to any one of the embodiments of the transmitting method, the method further includes:

transmitting configuration information of the determined transport block size index, and configuration information of the determined frequency-domain resource.

According to any one of the embodiments of the transmitting method, the method further includes:

after the time-frequency resource in the target sub-frame is obtained, transmitting information about a start position and/or an end position of the time-domain resource obtained in the target sub-frame.

According to any one of the embodiments of the transmitting method, the time-domain resource size obtained or to be possibly obtained in the target sub-frame is the number of Orthogonal Frequency Division Multiplex (OFDM) symbols obtained or to be possibly obtained in the target sub-frame.

A method for receiving a signal includes:

determining the size of a time-domain resource for transmitting a signal in a target sub-frame; and parsing the target sub-frame for a received signal according to the size of the time-domain resource for transmitting the signal in the target sub-frame.

Optionally, determining the size of a time-domain resource for transmitting a signal in a target sub-frame includes:

receiving information about a start position and/or an end position of the time-domain resource for transmitting the signal in the target sub-frame, and determining the size of the time-domain resource size for transmitting the signal in the target sub-frame according to the information.

Based on a first implementation and a second implementation of the abovementioned method for receiving a signal, before the target sub-frame is parsed for a received signal according to the size of the time-domain resource for transmitting the signal in the target sub-frame, the method further includes:

receiving configuration information of a transport block size index, and configuration information of a frequency-domain resource, corresponding to the signal in the target sub-frame; and determining the transport block size index of a transport block for transmitting the signal in the target sub-frame according to the configuration information of the transport block size index, and determining the size of the frequency-domain resource for transmitting the signal in the target sub-frame according to the configuration information of the frequency-domain resource; and parsing the target sub-frame for a received signal according to the size of the time-domain resource for the transmitting the signal in the target sub-frame includes:

adjusting the size of the frequency-domain resource according to an adjustment coefficient corresponding to a level of the size of the time-domain resource for transmitting the signal in the target sub-frame;

determining the size of the transport block for transmitting the signal in the target sub-frame according to the transport block size index and the adjusted size of the frequency-domain resource; and parsing the target sub-frame for the received signal according to the size of the transport block for transmitting the signal in the target sub-frame.

Based on the first implementation and the second implementation of the abovementioned method for receiving a signal, before the target sub-frame is parsed for a received signal according to the size of the time-domain resource for transmitting the signal in the target sub-frame, the method further includes:

receiving configuration information of a transport block size index, and configuration information of a frequency-domain resource, corresponding to the signal in the target sub-frame; and determining the transport block size index of a transport block for transmitting the signal in the target sub-frame according to the configuration information of the transport block size index, and determining the size of the frequency-domain resource for transmitting the signal in the target sub-frame according to the configuration information of the frequency-domain resource; and determining a candidate transport block size according to the transport block size index, and the size of the frequency resource; and parsing the target sub-frame for a received signal according to the time-domain resource size for the transmission signal in the target sub-frame includes:

adjusting the transport block size index according to an adjustment coefficient corresponding to a level of the size of the time-domain resource for transmitting the signal in the target sub-frame, and determining the size of a transport block for transmitting the signal in the target sub-frame according to the size of the frequency-domain resource and the adjusted transport block size index; or adjusting the transport block size index and the size of the frequency-domain resource according to an adjustment coefficient corresponding to a level of the size of the time-domain resource for transmitting the signal in the target sub-frame, and determining the size of a transport block for transmitting the signal in the target sub-frame according to the adjusted size of the frequency-domain resource and the adjusted transport block size index; and parsing the target sub-frame for the received signal according to the size of the transport block for transmitting the signal in the target sub-frame.

Based on the first implementation and the second implementation above of receiving a signal, before the target sub-frame is parsed for a received signal according to the size of the time-domain resource for transmitting the signal in the target sub-frame, the method further includes:

receiving configuration information of a transport block size index and configuration information of a frequency-domain resource, corresponding to the signal in the target sub-frame; and determining the transport block size index of a transport block for transmitting the signal in the target sub-frame according to the configuration information of the transport block size index, determining the size of the frequency-domain resource for transmitting the signal in the target sub-frame according to the configuration information of the frequency-domain resource; and determining a candidate transport block size according to the transport block size index and the size of the frequency-domain resource;

parsing the target sub-frame for a received signal according to the size of the time-domain resource for transmitting the signal in the target sub-frame includes:

determining the size of the transport block for transmitting the signal in the target sub-frame according to the size of the time-domain resource for transmitting the signal in the target sub-frame, and the candidate transport block size; and parsing the target sub-frame for the received signal according to the size of the transport block for transmitting the signal in the target sub-frame.

Based on the first implementation and the second implementation above of receiving a signal, before the target sub-frame is parsed for a received signal according to the size of the time-domain resource for transmitting the signal in the target sub-frame, the method further includes:

receiving configuration information of a transport block size index, and configuration information of a frequency-domain resource, corresponding to the signal in the target sub-frame; and determining the transport block size index of a transport block for transmitting the signal in the target sub-frame according to the configuration information of the transport block size index, and determining the size of the frequency-domain resource for transmitting the signal in the target sub-frame according to the configuration information of the frequency-domain resource; and determining a candidate transport block size according to the transport block size index and the size of the frequency-domain resource; and parsing the target sub-frame for a received signal according to the time-domain resource size for the transmission signal in the target sub-frame includes:

determining the size of the transport block for transmitting the signal in the target sub-frame according to an adjustment coefficient corresponding to a level of the size of the time-domain resource for transmitting the signal in the target sub-frame, and the candidate transport block size; and parsing the target sub-frame for a received signal according to the size of the transport block for transmitting the signal in the target sub-frame.

Based on the first implementation and the second implementation above of receiving a signal, before the target sub-frame is parsed for a received signal according to the size of the time-domain resource for transmitting the signal in the target sub-frame, the method further includes:

receiving configuration information of a transport block size index, and configuration information of a frequency-domain resource, corresponding to the signal in the target sub-frame; and determining the transport block size index of a transport block for transmitting the signal in the target sub-frame according to the configuration information of the transport block size index, and determining the size of the frequency-domain resource for transmitting the signal in the target sub-frame according to the configuration information of the frequency-domain resource; and parsing the target sub-frame for a received signal according to the size of the time-domain resource for transmitting the signal in the target sub-frame includes:

adjusting the size of the frequency-domain resource according to the size of the time-domain resource for transmitting the signal in the target sub-frame, and determining the size of a transport block for transmitting the signal in the target sub-frame according to the transport block size index, and the adjusted size of the frequency-domain resource; or adjusting the transport block size index according to the size of the time-domain resource for transmitting the signal in the target sub-frame, and determining the size of the transport block for transmitting the signal in the target sub-frame according to the size of the frequency-domain resource and the adjusted transport block size index; or adjusting the transport block size index and the size of the frequency-domain resource according to the size of the time-domain resource for transmitting the signal in the target sub-frame, and determining size of the transport block for transmitting the signal in the target sub-frame according to the adjusted transport block size index and the adjusted size of the frequency-domain resource; and parsing the target sub-frame for the received signal according to the size of the transport block for transmitting the signal in the target sub-frame.

Based on the first implementation and the second implementation above of receiving a signal, before the target sub-frame is parsed for a received signal according to the size of the time-domain resource for transmitting the signal in the target sub-frame, the method further includes:

receiving configuration information of a transport block size index, and configuration information of a frequency-domain resource, corresponding to the signal in the target sub-frame; and determining the transport block size index of a transport block for transmitting the signal in the target sub-frame according to the configuration information of the transport block size index, and determining the size of the frequency-domain resource for transmitting the signal in the target sub-frame according to the configuration information of the frequency-domain resource; and parsing the target sub-frame for a received signal according to the size of the time-domain resource for transmitting the signal in the target sub-frame includes:

determining a candidate frequency-domain resource for transmitting the signal in the target sub-frame according to the size of the time-domain resource for transmitting the signal in the target sub-frame, and the frequency-domain resource;

determining the size of a transport block for transmitting the signal in the target sub-frame according to the transport block size index and the candidate frequency-domain resource; and parsing the target sub-frame for the received signal according to the size of the transport block for transmitting the signal in the target sub-frame.

Based on any one of the embodiments above of the receiving method, the time-domain resource size obtained or to be possibly obtained in the target sub-frame is the number of Orthogonal Frequency Division Multiplex (OFDM) symbols obtained or to be possibly obtained in the target sub-frame.

Based upon the same inventive idea as the method, an embodiment of the disclosure further provides an device for transmitting a signal, the device including:

a signal preparing module configured to generate a transmission signal matching a time-domain resource size obtained or to be possibly obtained in a target sub-frame, according to the time-domain resource size; and a signal transmitting module configured to transmit the transmission signal that matches an obtained time-domain resource in the target sub-frame, after the time-frequency resource in the target sub-frame is obtained.

In a first aspect, the signal preparing module is configured:

before the time-frequency resource in the target sub-frame is obtained, to determine a transport block size matching the time-domain resource size to be possibly obtained in the target sub-frame, according to the time-domain resource size to be possibly obtained in the target sub-frame; and to generate the transmission signal matching the time-domain resource size to be possibly obtained in the target sub-frame according to the transport block size matching the time-domain resource size to be possibly obtained in the target sub-frame.

In a first possible implementation of the first aspect of the transmitting device, before a transport block size matching the time-domain resource size to be possibly obtained in the target sub-frame is determined according to the time-domain resource size to be possibly obtained in the target sub-frame, the signal preparing module is further configured:

to determine a transport block size index and a frequency-domain resource corresponding to the transmission signal in the target sub-frame; and the signal preparing module configured to determine a transport block size matching the time-domain resource size to be possibly obtained in the target sub-frame, according to the time-domain resource size to be possibly obtained in the target sub-frame is configured:

to adjust the size of the frequency-domain resource according to an adjustment coefficient corresponding to a level of the time-domain resource size to be possibly obtained in the target sub-frame, to obtain a frequency-domain resource size corresponding to the level; and to determine a transport block size matching the time-domain resource size to be possibly obtained in the target sub-frame at the level according to the transport block size index and the frequency-domain resource size corresponding to the level.

In a second possible implementation of the first aspect of the transmitting device, before a transport block size matching the time-domain resource size to be possibly obtained in the target sub-frame is determined according to the time-domain resource size to be possibly obtained in the target sub-frame, the signal preparing module is further configured:

to determine a transport block size index and a frequency-domain resource corresponding to the transmission signal in the target sub-frame; and the signal preparing module configured to determine a transport block size matching the time-domain resource size to be possibly obtained in the target sub-frame, according to the time-domain resource size to be possibly obtained in the target sub-frame is configured to:

to adjust the transport block size index according to an adjustment coefficient corresponding to a level of the time-domain resource size to be possibly obtained in the target sub-frame, to obtain a transport block size index corresponding to the level; and to determine a transport block size matching the time-domain resource size to be possibly obtained in the target sub-frame at the level according to the size of the frequency-domain resource, and the transport block size index corresponding to the level; or to adjust transport block size index and the size of the frequency-domain resource according to an adjustment coefficient corresponding to a level of the time-domain resource size to be possibly obtained in the target sub-frame, to obtain a transport block size index and a frequency-domain resource size corresponding to the level; and to determine a transport block size matching the time-domain resource size to be possibly obtained in the target sub-frame at the level according to the transport block size index and the frequency-domain resource size corresponding to the level.

In a third possible implementation of the first aspect of the transmitting device, before a transport block size matching the time-domain resource size to be possibly obtained in the target sub-frame is determined according to the time-domain resource size to be possibly obtained in the target sub-frame, the signal preparing module is further configured:

to determine a transport block size index and a frequency-domain resource corresponding to the transmission signal in the target sub-frame; and determining a candidate transport block size according to the transport block size index, and the size of the frequency-domain resource; and the signal preparing module configured to determine a transport block size matching the time-domain resource size to be possibly obtained in the target sub-frame, according to the time-domain resource size to be possibly obtained in the target sub-frame is configured:

to a transport block size matching the time-domain resource size to be possibly obtained in the target sub-frame at a level according to an adjustment coefficient corresponding to the level of the time-domain resource size to be possibly obtained in the target sub-frame, and the candidate transport block size.

In a fourth possible implementation of the first aspect of the transmitting device, before a transport block size matching the time-domain resource size to be possibly obtained in the target sub-frame is determined according to the time-domain resource size to be possibly obtained in the target sub-frame, the signal preparing module is further configured:

to determine a transport block size index and a frequency-domain resource corresponding to the transmission signal in the target sub-frame; and determining a candidate transport block size according to the transport block size index and the size of the frequency-domain resource; and the signal preparing module configured to determine a transport block size matching the time-domain resource size to be possibly obtained in the target sub-frame, according to the time-domain resource size to be possibly obtained in the target sub-frame is configured:

to determine a transport block size matching the time-domain resource size to be possibly obtained in the target sub-frame according to the time-domain resource size to be possibly obtained in the target sub-frame and the candidate transport block size.

In a fifth possible implementation of the first aspect of the transmitting device, before a transport block size matching the time-domain resource size to be possibly obtained in the target sub-frame is determined according to the time-domain resource size to be possibly obtained in the target sub-frame, the signal preparing module is further configured:

to determine a transport block size index and a frequency-domain resource corresponding to the transmission signal in the target sub-frame; and the signal preparing module configured to determine a transport block size matching the time-domain resource size to be possibly obtained in the target sub-frame, according to the time-domain resource size to be possibly obtained in the target sub-frame is configured:

to the size of the frequency-domain resource according to the time-domain resource size to be possibly obtained in the target sub-frame; and determining the transport block size matching the time-domain resource size to be possibly obtained in the target sub-frame according to the transport block size index, and the adjusted size of the frequency-domain resource; or to the transport block size index according to the time-domain resource size to be possibly obtained in the target sub-frame; and determining the transport block size matching the time-domain resource size to be possibly obtained in the target sub-frame according to the size of the frequency-domain resource, and the adjusted transport block size index; or to the transport block size index and the size of frequency-domain resource according to the time-domain resource size to be possibly obtained in the target sub-frame; and determining the transport block size matching the time-domain resource size to be possibly obtained in the target sub-frame according to the adjusted transport block size index and size of the frequency-domain resource.

In a second aspect, the signal preparing module is configured:

after the time-frequency resource in the target sub-frame is obtained, to generate the transmission signal matching the time-domain resource size obtained in the target sub-frame, according to the time-domain resource size obtained in the target sub-frame.

In a first possible implementation of the second aspect of the device, the signal preparing module is configured:

to determine transport block size index and a frequency-domain resource corresponding to the transmission signal in the target sub-frame;

to adjust the size of the frequency-domain resource according to an adjustment coefficient corresponding to a level of the time-domain resource size obtained in the target sub-frame, and to determine a transport block size matching the obtained time-domain resource size obtained in the target sub-frame according to the transport block size index, and the adjusted size of the frequency-domain resource; or to adjust the transport block size index according to an adjustment coefficient corresponding to a level of the time-domain resource size obtained in the target sub-frame, and to determine a transport block size matching the obtained time-domain resource size according to the adjusted transport block size index, and the size of the frequency-domain resource; or to adjust the transport block size index and the size of the frequency-domain resource according to an adjustment coefficient corresponding to a level of the time-domain resource size obtained in the target sub-frame, and to determine a transport block size matching the obtained time-domain resource size according to the adjusted transport block size index, and the adjusted size of the frequency-domain resource; and to generate the transmission signal matching the time-domain resource size according to the transport block size matching the time-domain resource size.

In a second possible implementation of the second aspect of the transmitting device, the signal preparing module is configured:

to determine a transport block size index and a frequency-domain resource corresponding to the transmission signal in the target sub-frame; to determine a candidate transport block size according to the transport block size index and the frequency-domain resource; to determine a transport block size matching the obtained time-domain resource size according to an adjustment coefficient corresponding to a level of the time-domain resource size obtained in the target sub-frame, and the candidate transport block size; and to generate a transmission signal matching the time-domain resource size obtained in the target sub-frame according to the transport block size matching the time-domain resource size obtained in the target sub-frame.

In a third possible implementation of the second aspect of the transmitting device, the signal preparing module is configured:

to determine a transport block size index and a frequency-domain resource corresponding to the transmission signal in the target sub-frame; to determine a candidate transport block size according to the transport block size index and the frequency-domain resource; to determine a transport block size matching the time-domain resource size obtained in the target sub-frame according to the time-domain resource size obtained in the target sub-frame, and the candidate transport block size; and to generating the transmission signal matching the time-domain resource size obtained in the target sub-frame according to the transport block size matching the time-domain resource size obtained in the target sub-frame.

In a fourth possible implementation of the second aspect of the transmitting device, the signal preparing module is configured:

to determine a transport block size index and a frequency-domain resource corresponding to the transmission signal in the target sub-frame;

to adjust the size of the frequency-domain resource according to the time-domain resource size obtained in the target sub-frame, and to determine a transport block size matching the time-domain resource size obtained in the target sub-frame according to the transport block size index, and the adjusted size of the frequency-domain resource; or to adjust the transport block size index according to the time-domain resource size obtained in the target sub-frame, and to determine a transport block size matching the time-domain resource size obtained in the target sub-frame according to the size of the frequency-domain resource and the adjusted transport block size index; or to adjust the transport block size index, and the size of the frequency-domain resource according to the time-domain resource size obtained in the target sub-frame, and to determine a transport block size matching the time-domain resource size obtained in the target sub-frame according to the adjusted transport block size index, and the adjusted size of the frequency-domain resource; and to generate the transmission signal matching the time-domain resource size obtained in the target sub-frame according to the transport block size matching the time-domain resource size obtained in the target sub-frame.

In a fifth possible implementation of the second aspect of the transmitting device, the signal preparing module is configured:

to determine a transport block size index and a candidate frequency-domain resource corresponding to the transmission signal in the target sub-frame; to determine a transport block size according to the transport block size index and the candidate frequency-domain resource; to determine a frequency-domain resource matching the time-domain resource size obtained in the target sub-frame according to the time-domain resource size obtained in the target sub-frame, and the candidate frequency-domain resource; and to generate the transmission signal matching the time-domain resource size obtained in the target sub-frame according to the frequency-domain resource matching the time-domain resource size obtained in the target sub-frame and the transport block size.

Based on any one of the embodiments of the transmitting device, the signal preparing module is further configured:

to transmit configuration information of the determined transport block size index and configuration information of the determined frequency-domain resource.

Based on any one of the embodiments of the transmitting device, the signal preparing module is further configured:

after the time-frequency resource in the target sub-frame is obtained, to transmit information about a start position and/or an end position of the time-domain resource obtained in the target sub-frame.

Based on any one of the embodiments of the transmitting device, the time-domain resource size obtained or to be possibly obtained in the target sub-frame is the number of Orthogonal Frequency Division Multiplex (OFDM) symbols obtained or to be possibly obtained in the target sub-frame.

Based upon the same inventive idea as the method, an embodiment of the disclosure further provides an device for receiving a signal, the device including:

a first receiving processing module configured to determine the size of a time-domain resource for transmitting a signal in a target sub-frame; and a second receiving processing module configured to parse the target sub-frame for a received signal according to the size of the time-domain resource for transmitting the signal in the target sub-frame.

Optionally the first receiving processing module is configured:

to receive information about a start position and/or an end position of the time-domain resource for transmitting the signal in the target sub-frame; and to determine the size of the time-domain resource for transmitting the signal in the target sub-frame according to the information.

Based on the first implementation and the second implementation of the device for receiving a signal, the second receiving processing module is configured:

to receive configuration information of a transport block size index, and configuration information of a frequency-domain resource, corresponding to the signal in the target sub-frame; and to determine the transport block size index of the transport block for transmitting the signal in the target sub-frame according to the configuration information of the transport block size index, and to determine the size of the frequency-domain resource for transmitting the signal in the target sub-frame according to the configuration information of the frequency-domain resource; to adjust the size of the frequency-domain resource according to an adjustment coefficient corresponding to a level of the size of the time-domain resource size for transmitting the signal in the target sub-frame; to determine the size of the transport block for transmitting the signal in the target sub-frame according to the transport block size index, and the adjusted size of the frequency-domain resource; and to parse the target sub-frame for the received signal according to the size of the transport block for transmitting the signal in the target sub-frame.

Based on the first implementation and the second implementation of the device for receiving a signal, the second receiving processing module is configured:

to receive configuration information of a transport block size index, and configuration information of a frequency-domain resource, corresponding to the signal in the target sub-frame; to determine the transport block size index of a transport block for transmitting the signal in the target sub-frame according to the configuration information of the transport block size index, and to determine the size of the frequency-domain resource for transmitting the signal in the target sub-frame according to the configuration information of the frequency-domain resource;

to adjust the transport block size index according to an adjustment coefficient corresponding to a level of the size of the time-domain resource for transmitting the signal in the target sub-frame, and to determine the size of a transport block for transmitting the signal in the target sub-frame according to the size of the frequency-domain resource and the adjusted transport block size index; or to adjust the transport block size index and the size of the frequency-domain resource according to an adjustment coefficient corresponding to a level of the size of the time-domain resource for transmitting the signal in the target sub-frame, and to determine the size of a transport block for transmitting the signal in the target sub-frame according to the adjusted size of the frequency-domain resource and the adjusted transport block size index; and to parse the target sub-frame for the received signal according to the size of the transport block for transmitting the signal in the target sub-frame.

Based on the first implementation and the second implementation of the device for receiving a signal, the second receiving processing module is configured:

to receive configuration information of a transport block size index and configuration information of a frequency-domain resource, corresponding to the signal in the target sub-frame; to determine the transport block size index of a transport block for transmitting the signal in the target sub-frame according to the configuration information of the transport block size index, and to determine the size of the frequency-domain resource for transmitting the signal in the target sub-frame according to the configuration information of the frequency-domain resource; to determine a candidate transport block size according to the transport block size index and the size of the frequency-domain resource; to determine the size of the transport block for transmitting the signal in the target sub-frame according to an adjustment coefficient corresponding to a level of the size of the time-domain resource for transmitting the signal in the target sub-frame, and the candidate transport block size; and to parse the target sub-frame for the received signal according to the size of the transport block for transmitting the signal in the target sub-frame.

Further to the first implementation and the second implementation of the device for receiving a signal, the second receiving processing module is configured:

to receive configuration information of a transport block size index, and configuration information of a frequency-domain resource, corresponding to the signal in the target sub-frame; to determine the transport block size index of a transport block for transmitting the signal in the target sub-frame according to the configuration information of the transport block size index, and to determine the size of the frequency-domain resource for transmitting the signal in the target sub-frame according to the configuration information of the frequency-domain resource; to determine a candidate transport block size according to the transport block size index and the size of the frequency-domain resource; to determine the size of the transport block for transmitting the signal in the target sub-frame according to an adjustment coefficient corresponding to a level of the size of the time-domain resource for transmitting the signal in the target sub-frame, and the candidate transport block size; and to parse the target sub-frame for a received signal according to the size of the transport block for transmitting the signal in the target sub-frame.

Based on the first implementation and the second implementation of the device for receiving a signal, the second receiving processing module is configured:

to receive configuration information of a transport block size index, and configuration information of a frequency-domain resource, corresponding to the signal in the target sub-frame; and to determine the transport block size index of a transport block for transmitting the signal in the target sub-frame according to the configuration information of the transport block size index, and to determine the size of the frequency-domain resource for transmitting the signal in the target sub-frame according to the configuration information of the frequency-domain resource;

to adjust the size of the frequency-domain resource according to the size of the time-domain resource for transmitting the signal in the target sub-frame, and to determine the size of a transport block for transmitting the signal in the target sub-frame according to the transport block size index, and the adjusted size of the frequency-domain resource; or to adjust the transport block size index according to the size of the time-domain resource for transmitting the signal in the target sub-frame, and to determine the size of the transport block for transmitting the signal in the target sub-frame according to the size of the frequency-domain resource and the adjusted transport block size index; or to adjust the transport block size index and the size of the frequency-domain resource according to the size of the time-domain resource for transmitting the signal in the target sub-frame, and to determine size of the transport block for transmitting the signal in the target sub-frame according to the adjusted transport block size index and the adjusted size of the frequency-domain resource; and to parse the target sub-frame for the received signal according to the size of the transport block for transmitting the signal in the target sub-frame.

Based on the first implementation and the second implementation of the device for receiving a signal, the second receiving processing module is configured:

to receive configuration information of a transport block size index, and configuration information of a frequency-domain resource, corresponding to the signal in the target sub-frame; and to determine the transport block size index of a transport block for transmitting the signal in the target sub-frame according to the configuration information of the transport block size index, and to determine the size of the frequency-domain resource for transmitting the signal in the target sub-frame according to the configuration information of the frequency-domain resource; to determine a candidate frequency-domain resource for transmitting the signal in the target sub-frame according to the size of the time-domain resource for transmitting the signal in the target sub-frame, and the frequency-domain resource; to determine the size of a transport block for transmitting the signal in the target sub-frame according to the transport block size index and the candidate frequency-domain resource; and to parse the target sub-frame for the received signal according to the size of the transport block for transmitting the signal in the target sub-frame.

Based on the first implementation and the second implementation of the device for receiving a signal, the time-domain resource size obtained or to be possibly obtained in the target sub-frame is the number of Orthogonal Frequency Division Multiplex (OFDM) symbols obtained or to be possibly obtained in the target sub-frame.

Based upon the same inventive idea as the method, an embodiment of the disclosure provides a base station including:

a processor, a transceiver, and a memory, wherein:

the processor is configured to read a program in the memory, and to perform the process of each embodiment of the method above for transmitting a signal, and/or to perform the process of each embodiment of the method above for receiving a signal;

the transceiver is configured to be controlled by the processor to transmit and receive data; and the memory is configured to store data to be used by the processor in operation.

Based upon the same inventive idea as the method, an embodiment of the disclosure provides a terminal including:

a processor, a transceiver, and a memory, wherein:

the processor is configured to read a program in the memory, and to perform the process of each embodiment of the method above for receiving a signal, and/or to perform the process of each embodiment of the method above for transmitting a signal;

the transceiver is configured to be controlled by the processor to transmit and receive data; and the memory is configured to store data to be used by the processor in operation.

Optionally the processor of the terminal does not have to perform the process of transmitting the configuration information of the transport block size index, and the configuration information of the frequency-domain resource.

DETAILED DESCRIPTION OF THE EMBODIMENTS

In the technical solutions according to the embodiments of the disclosure, at the signal transmitter's side, a transmission signal is generated according to a size of a time-domain resource obtained or to be possibly obtained in a target sub-frame (that is, the signal to be transmitted is prepared), and the signal is transmitted after the time-frequency resource in the target sub-frame is obtained; and at the signal receiver's side, a signal received in a target sub-frame is parsed according to a size of a time-domain resource for transmitting the signal in the target sub-frame (i.e., a time-domain resource obtained by the transmitter). Here a target sub-frame is typically a sub-frame where a channel is preempted as a result of contention, and/or a sub-frame where a channel is exit, i.e., a start sub-frame and/or an end sub-frame of signal transmission. If only a partial time-domain resource in a target sub-frame is obtained, then a signal can be transmitted in the partial sub-frame in the technical solutions according to the embodiments of the disclosure to improve efficiency of transmission.

The technical solutions according to the embodiments of the disclosure will be described below in details with reference to the drawings.

Figure 1:
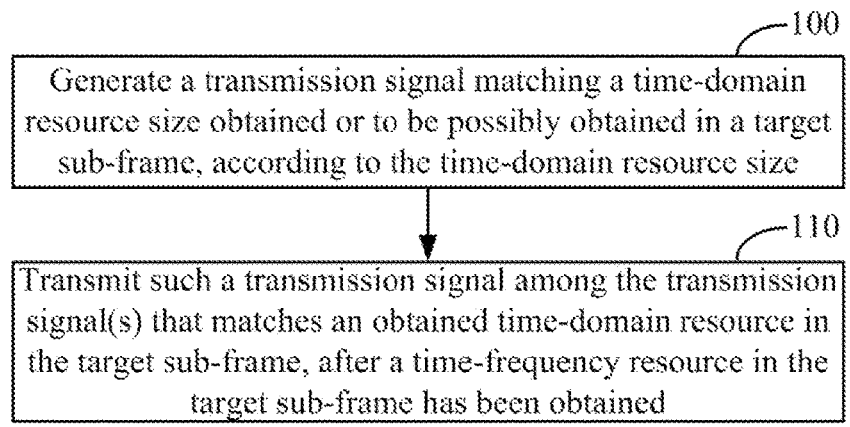
FIG. 1 is a flow chart of a method for transmitting a signal according to an embodiment of the disclosure.

FIG. 1 illustrates a method for transmitting a signal according to an embodiment of the disclosure, where the method particularly includes the following operations.

The operation 100 is to generate a transmission signal matching a time-domain resource size obtained in a target sub-frame according to the time-domain resource size obtained in the target sub-frame, or to generate transmission signal(s) matching time-domain resource size(s) to be possibly obtained in a target sub-frame according to the time-domain resource size(s) to be possibly obtained in a target sub-frame.

Here the signal may be data and/or signaling.

Here the time-domain resource size can be represented at various resource granularities, but the embodiment of the disclosure will not be limited in this regard. For example, the time-domain resource size is represented by the number of Orthogonal Frequency Division Multiplex (OFDM) symbols.

Here if a time-domain resource size of a complete sub-frame is N time-domain resource granularities, then a part or all of 1, 2, . . . , N−1 time-domain resource granularities will be time-domain resource sizes to be possibly obtained in the target sub-frame.

The operation 110 is to transmit such a transmission signal among the transmission signal(s) that matches an obtained time-domain resource in the target sub-frame, after a time-frequency resource in the target sub-frame has been obtained.

The technical solution according to the embodiment of the disclosure is applicable to transmission of a downlink signal, and accordingly the signal transmitter can be a base station. The technical solution according to the embodiment of the disclosure is also applicable to uplink transmission, and accordingly the signal transmitter can be a terminal.

Here the base station can be an evolved Node B (eNode B or eNB), a Base station Transceiver Station (BTS), a Node B, a Home Node B (HNB), a Home eNodeB (HeNB), a Relay Node (RN), a Wireless Access Point (AP), a wireless router, or another similar device.

Here the terminal can be a mobile phone, a tablet, a laptop, a data card, a netbook computer, a smart watch, a wireless broadband hotspot router (MiFi), or a product capable of wireless communication such as a digital camera, a smart electricity meter, or a home appliance. The user terminal can communicate wirelessly with various base stations using one or more radio access technologies.

According to an embodiment of the disclosure, there are a plurality of ways of implementing the operation 100. As categorized by the timing at which an implementation is performed, the implementations of the operation 100 fall into the following two categories.

In a first category of implementations of the operation 100, before the time-frequency resource in the target sub-frame is obtained, transport block size(s) matching the time-domain resource size(s) to be possibly obtained in the target sub-frame is determined according to the time-domain resource size(s) to be possibly obtained in the target sub-frame, and the transmission signal(s) matching the time-domain resource size(s) to be possibly obtained is generated according to the transport block size(s) matching the time-domain resource size(s) to be possibly obtained in the target sub-frame.

By way of an example where the time-frequency resource in the target sub-frame is obtained as a result of contention, in the first category of implementations of the operation 100, the operation 100 can be performed before the contention for the time-frequency resource is started (for example, a CCA detection is started), or the operation 100 can be performed at the same time as or after the contention for the time-frequency resources is started, as long as the operation 100 is performed before the time-frequency resource in the target sub-frame is obtained.

In the abovementioned first category of implementations of the operation 100, the transport block size(s) matching the time-domain resource size(s) to be possibly obtained in the target sub-frame can be determined in a plurality of implementations, several of which will be exemplified below.

In a first implementation in which the transport block size(s) matching the time-domain resource size(s) to be possibly obtained in the target sub-frame is determined, a size of a frequency-domain resource is adjusted according to adjustment coefficient(s) corresponding to each level of time-domain resource size(s) to be possibly obtained in the target sub-frame, to obtain frequency-domain resource size(s) (e.g., the number of Physical Resource Blocks (PRBs)) corresponding to each level; and transport block size(s) matching the time-domain resource size(s) to be possibly obtained in the target sub-frame at each level is determined, respectively, according to a transport block size index and the frequency-domain resource size(s) corresponding to each level, where the Transport Block (TB) size index and the frequency-domain resource before the adjustment are determined before the transport block size(s) matching the time-domain resource size(s) to be possibly obtained in the target sub-frame is determined. Accordingly the first implementation further includes the following operation: the transport block size index and the frequency-domain resource, corresponding to the transmission signal in the target sub-frame, are determined. Particularly the transport block size index and the frequency-domain resource, corresponding to the transmission signal in the target sub-frame, could be determined according to channel information as in the prior art without any limitation thereto.

It shall be noted that in the embodiment of the disclosure, the frequency-domain resource size is adjusted only for the purpose of determining the transport block size(s) without actually changing the size of a frequency-domain resource configured for transmitting a signal (i.e., the size of the abovementioned determined frequency-domain resource corresponding to the transmission signal in the target sub-frame).

In the implementation above, the size of the frequency-domain resource is adjusted particularly by converting the size of the frequency-domain resource before the adjustment into an integer using an adjustment coefficient. Optionally an adjusted frequency-domain resource size is a certain frequency-domain resource size in a TB size table.

In the implementation above, particularly the TB size table can be searched for transport block size(s) with a transport block size index corresponding respectively to the frequency-domain resource size(s) corresponding to each level, where a transport block size obtained by searching the table using a transport block size index and a frequency-domain resource size corresponding to a level M is a transport block size corresponding to each time-domain resource size to be possibly obtained in the target sub-frame at the level M.

In the abovementioned optional implementation, only transport block size(s) matching each level of time-domain resource size(s) to be possibly obtained in the target sub-frame will be determined instead of determining respectively transport block size(s) matching each time-domain resource size to be possibly obtained in the target sub-frame, thereby improving processing efficiency of preparing a signal for transmission and improving operating performance of a system.

Based on the abovementioned optional implementation, the method for transmitting a signal according to the embodiment of the disclosure will be described below by way of an example in which downlink data is transmitted, where a base station determines a Modulation and Coding Scheme (MCS) and a frequency-domain resource corresponding to a transmission signal according to channel information, and transmits configuration information of the determined MCS and configuration information of the determined frequency-domain resource over a Physical Downlink Control Channel (PDCCH)/enhanced Physical Downlink Control Channel (ePDCCH) of a primary carrier, or over an ePDCCH of a secondary carrier in an unlicensed frequency band; the base station further converts the size of the determined frequency-domain resource into frequency-domain resource sizes in a plurality of versions according to adjustment coefficients corresponding to levels of the number of OFDM symbols to be possibly obtained in the target sub-frame, and searches a TB size table for transport block sizes in a plurality of versions according to the frequency-domain resource sizes determined as a result of conversion and transport block size indexes corresponding to the MCS, where each transport block size corresponds respectively to the number of OFDM symbols to be possibly obtained at a level; and the base station performs code block segmentation, encoding, and rate matching respectively according to transport block size in each version, and obtains encoded data in a plurality of versions; and then the base station performs modulation, layer mapping and pre-encoding on encoded data in each version to obtain transmission signals matching the number of OFDM symbols to be possibly obtained at each level. It shall be noted that the transmission signals are further generated according to the determined frequency-domain resource above.

In a second implementation in which the transport block size(s) matching the time-domain resource size(s) to be possibly obtained in the target sub-frame is determined, a transport block size index is adjusted according to adjustment coefficient(s) corresponding to each level of the time-domain resource size(s) to be possibly obtained in the target sub-frame, to obtain transport block size index(es) corresponding to each level; and the transport block size(s) matching the time-domain resource size(s) to be possibly obtained in the target sub-frame at each level is determined respectively according to the size of the frequency-domain resource and the transport block size index(es) corresponding to each level. Accordingly the transport block size index and frequency-domain resource corresponding to the transmission signal in the target sub-frame are further determined before the transport block size(s) matching the time-domain resource size(s) to be possibly obtained in the target sub-frame is determined according to the time-domain resource size(s) to be possibly obtained in the target sub-frame.

Reference can be made to the description of the above-mentioned optional implementation for a particular implementation of the second implementation, so a repeated description of the second implementation will be omitted here.

It shall be noted that in the embodiment of the disclosure, the transport block size index is adjusted only for the purpose of determining the transport block size(s) without changing the transport block size index configured for the real transmission signal (i.e., the abovementioned determined transport block size index corresponding to the transmission signal in the target sub-frame).

In a third implementation in which the transport block size(s) matching the time-domain resource size(s) to be possibly obtained is determined, a transport block size index and a size of a frequency-domain resource are adjusted according to adjustment coefficient(s) corresponding to each level of the time-domain resource size(s) to be possibly obtained in the target sub-frame, to obtain transport block size index(es) and frequency-domain resource size(s) corresponding to each level; and the transport block size(s) matching the time-domain resource size(s) to be possibly obtained in the target sub-frame at each level is determined respectively according to the transport block size index(es) and the frequency-domain resource size(s) corresponding to each level. Accordingly the transport block size index and frequency-domain resource corresponding to the transmission signal in the target sub-frame are further determined before the transport block size(s) matching the time-domain resource size(s) to be possibly obtained in the target sub-frame is determined according to the time-domain resource size(s) to be possibly obtained in the target sub-frame.

Reference can be made to the description of the above-mentioned optional implementation for a particular implementation of the third implementation, so a repeated description of the second implementation will be omitted here.

In a fourth implementation in which the transport block size(s) matching the time-domain resource size(s) to be possibly obtained is determined, the transport block size(s) matching time-domain resource size(s) to be possibly obtained in the target sub-frame at each level is determined according to adjustment coefficient(s) corresponding to level(s) of the time-domain resource size(s) to be possibly obtained in the target sub-frame, and a candidate transport block size. Accordingly before the transport block size(s) matching the time-domain resource size(s) to be possibly obtained in the target sub-frame is determined according to the time-domain resource size(s) to be possibly obtained in the target sub-frame, a transport block size index and a frequency-domain resource corresponding to the transmission signal in the target signal are further determined; and the candidate transport block size is determined according to the transport block size index and the size of the frequency-domain resource.

Particularly the candidate transport block size can be converted according to the adjustment coefficient(s).

In the first to fourth implementations above in which the transport block size(s) matching the time-domain resource size(s) to be possibly obtained is determined, the time-domain resource sizes to be possibly obtained in the target sub-frame are divided into several levels, each of which corresponds to an adjustment coefficient, and time-domain resource size(s) to be possibly obtained in the target sub-frame at a same level matches a same Transport Block (TB) size, where there are a plurality of schemes to divide the time-domain resource sizes to be possibly obtained in the target sub-frame into several levels. For example, the time-domain resource sizes to be possibly obtained in the target sub-frame are 1 OFDM symbol, 2 OFDM symbols, . . . , and 12 OFDM symbols respectively, where 1 to 3 OFDM symbols are divided into a same level, 4 to 8 OFDM symbols are divided into a same level, and 9 to 13 OFDM symbols are divided into a same level.

In a fifth implementation in which the transport block size(s) matching the time-domain resource size(s) to be possibly obtained is determined, the transport block size(s) matching each time-domain resource size to be possibly obtained in the target sub-frame is determined according to each time-domain resource size to be possibly obtained in the target sub-frame and a candidate transport block size. Accordingly before the transport block size(s) matching the time-domain resource size(s) to be possibly obtained in the target sub-frame is determined according to the time-domain resource size(s) to be possibly obtained, a transport block size index and a frequency-domain resource corresponding to the transmission signal in the target sub-frame are further determined; and the candidate transport block size is determined according to the transport block size index, and the size of the frequency-domain resource.

Here there are a plurality of implementations in which the transport block size(s) matching the time-domain resource size(s) to be possibly obtained in the target sub-frame is determined according to the time-domain resource size(s) to be possibly obtained in the target sub-frame and the candidate transport block size. Particularly the time-domain resource size(s) to be possibly obtained in the target sub-frame and the candidate transport block size are taken as input parameters of a predetermined mapping function, where calculation result(s) of the mapping function is transport block size(s) matching the time-domain resource size(s) to be possibly obtained in the target sub-frame. For example, a simple mapping function is a function with a quasi-linear relationship between an input parameter and a calculation result. Suppose a complete sub-frame with a normal Cyclic Prefix (CP) includes 14 OFDM symbols, a transport block size index with which the table is searched is $I_{TBS}$=m, a corresponding transport block size in the TB size table in a protocol is $TBS_{in}$ given the number of PRBs $N_{PRB}$=n, and the number of OFDM symbols to be possibly used for data transmission in the target sub-frame is N, then a transport block size matching N will be $$TBS_{out} = 8 \cdot f\left(\frac{N \times TBS_{in}}{14 \times 8}\right),$$

where the function f may be an integral function int(·) which may be round( ), ceil( ), floor( ), fix( ), etc., in Matlab; and hereupon the transport block size matching N can be further determined by mapping $$8 \cdot f\left(\frac{N \times TBS_{in}}{14 \times 8}\right)$$

to some value in the TB size table in the original protocol, or an available value approximating $$8 \cdot f\left(\frac{N \times TBS_{in}}{14 \times 8}\right).$$

In a sixth implementation in which the transport block size(s) matching the time-domain resource size(s) to be possibly obtained in the target sub-frame is determined, a size of a frequency-domain resource is adjusted according to each time-domain resource size to be possibly obtained in the target sub-frame, and the transport block size(s) matching each time-domain resource size to be possibly obtained in the target sub-frame is determined according to a transport block size index and the adjusted size(s) of the frequency-domain resource. Accordingly the transport block size index and the frequency-domain resource, corresponding to the transmission signal in the target sub-frame, are further determined before the transport block size(s) matching the time-domain resource size(s) to be possibly obtained in the target sub-frame are determined according to the time-domain resource size(s) to be possibly obtained in the target sub-frame.

Here there are a plurality of implementations in which the size of the frequency-domain resource is adjusted according to each time-domain resource size to be possibly obtained in the target sub-frame. Particularly the size of the frequency-domain resource is converted according to the possible time-domain resource size(s). For example, if there is a normal CP, then an adjusted frequency source size will be $$\text{int}\left(\frac{N \times N_{PRB}}{14}\right).$$

In a seventh implementation in which the transport block size(s) matching the time-domain resource size(s) to be possibly obtained in the target sub-frame is determined, a transport block size index is adjusted according to each time-domain resource size to be possibly obtained in the target sub-frame, and the transport block size(s) matching each time-domain resource size(s) to be possibly obtained in the target sub-frame is determined according to the size of a frequency-domain resource and the adjusted transport block size index(es). Accordingly the transport block size index and the frequency-domain resource corresponding to the transmission signal in the target sub-frame are further determined before the transport block size(s) matching the time-domain resource size(s) to be possibly obtained in the target sub-frame is determined according to the time-domain resource size(s) to be possibly obtained in the target sub-frame.

There are a plurality of implementations in which a transport block size index is adjusted according to each time-domain resource size to be possibly obtained in the target sub-frame. Particularly the transport block size index is converted according to the possible time-domain resource size(s). In a particular implementation, the transport block size index can be converted in a way similar to how the size of a frequency-domain resource is converted.

In an eighth implementation in which the transport block size(s) matching the time-domain resource size(s) to be possibly obtained in the target sub-frame is determined, a transport block size index and a size of a frequency-domain resource are adjusted according to each time-domain resource size to be possibly obtained in the target sub-frame, and the transport block size(s) matching each time-domain resource size to be possibly obtained in the target sub-frame is determined according to the adjusted transport block size index(es) and the adjusted size(s) of the frequency-domain resource. Accordingly the transport block size index and the frequency-domain resource corresponding to the transmission signal in the target sub-frame are further determined before the transport block size(s) matching the time-domain resource size(s) to be possibly obtained in the target sub-frame are determined according to the time-domain resource size(s) to be possibly obtained in the target sub-frame.

In the respective implementations above, the size of the frequency-domain resource and the transport block size index are adjusted merely for the purpose of determining the transport block size(s) matching the time-domain resource size(s) to be possibly obtained in the target sub-frame without changing the size of the frequency-domain resource and the transport block size index corresponding to the real transmission signal.

In the fifth to eighth implementations above, the transport block size(s) matching to each time-domain resource size to be possibly obtained in the target sub-frame can be determined to determine a precise value of the TB size so as to improve the performance of signal transmission.

In a second category of implementations of the operation 100 above, after the time-frequency resource in the target sub-frame is obtained, the transmission signal matching the size of the obtained time-frequency resource is generated according to the time-domain resource size obtained in the target sub-frame.

The second category of implementations of the operation 100 above can be further categorized into a plurality of particular implementations, which will be described below respectively by way of example.

In a particular implementation of the operation 100, a size of a frequency-domain resource is adjusted according to an adjustment coefficient corresponding to a level of the time-domain resource size obtained in the target sub-frame; a transport block size matching the obtained time-domain resource size is determined according to a transport block size index and the adjusted size of the frequency-domain resource; and the transmission signal matching the obtained time-domain resource size is generated according to the transport block size matching the obtained time-frequency resource. Accordingly the transport block size index and frequency-domain resource corresponding to the transmission signal in the target sub-frame are further determined before the transmission signal matching the time-domain resource size obtained in the target sub-frame are generated according to the obtained time-domain resource size.

Here in a particular implementation, the transport block size matching the obtained time-domain resource size can be determined as described in the first implementation above, so a repeated description thereof will be omitted here.

In a further particular implementation of the operation 100, a transport block size index is adjusted according to an adjustment coefficient corresponding to a level of the time-domain resource size obtained in the target sub-frame; a transport block size matching the obtained time-domain resource size is determined according to the adjusted transport block size index and the size of the frequency-domain resource; and the transmission signal matching the obtained time-domain resource size is generated according to the transport block size matching the obtained time-frequency resource size. Accordingly the transport block size index and frequency-domain resource corresponding to the transmission signal in the target sub-frame are further determined before the transmission signal matching the time-domain resource size obtained in the target sub-frame is generated according to the obtained time-domain resource size.

Here in a particular implementation, the transport block size matching the obtained time-domain resource size can be determined as described in the second implementation above, so a repeated description thereof will be omitted here.

In a further particular implementation of the operation 100, a transport block size index and a size of a frequency-domain resource are adjusted according to an adjustment coefficient corresponding to a level of the time-domain resource size obtained in the target sub-frame; a transport block size matching the obtained time-domain resource size is determined according to the adjusted transport block size index and the adjusted size of the frequency-domain resource; and the transmission signal matching the obtained time-domain resource size is generated according to the transport block size matching the obtained time-frequency resource size. Accordingly the transport block size index and frequency-domain resource corresponding to the transmission signal in the target sub-frame are further determined before the transmission signal matching the time-domain resource size obtained in the target sub-frame is generated according to the obtained time-domain resource size.

Here in a particular implementation, the transport block size matching the obtained time-domain resource size can be determined as described in the third implementation above, so a repeated description thereof will be omitted here.

In a further particular implementation of the operation 100, a transport block size matching the time-domain resource size obtained in the target sub-frame is determined according to an adjustment coefficient corresponding to a level of the obtained time-domain resource size and a candidate transport block size; and the transmission signal matching the obtained time-domain resource size is generated according to the transport block size matching the obtained time-frequency resource. Accordingly before the transmission signal matching the time-domain resource size obtained in the target sub-frame is generated according to the obtained time-domain resource size, a transport block size index and a frequency-domain resource corresponding to the transmission signal in the target sub-frame are further determined; and the candidate transport block size is determined according to the transport block size index and frequency-domain resource.

Here in a particular implementation, the transport block size matching the obtained time-domain resource size can be determined as described in the fourth implementation above, so a repeated description thereof will be omitted here.

In a further particular implementation of the operation 100, a transport block size matching the time-domain resource size obtained in the target sub-frame is determined according to the obtained time-domain resource size and a candidate transport block size; and the transmission signal matching the obtained time-domain resource size is generated according to the transport block size matching the obtained time-domain resource size. Accordingly before the transmission signal matching the time-domain resource size obtained in the target sub-frame is generated according to the obtained time-domain resource size, a transport block size index and a frequency-domain resource corresponding to the transmission signal in the target sub-frame are further determined; and the candidate transport block size is determined according to the transport block size index and frequency-domain resource.

Here in a particular implementation, the transport block size matching the obtained time-domain resource size can be determined as described in the fifth implementation above, so a repeated description thereof will be omitted here.

In a further particular implementation of the operation 100, a size of a frequency-domain resource is adjusted according to the time-domain resource size obtained in the target sub-frame; a transport block size matching the time-domain resource size obtained in the target sub-frame is determined according to a transport block size index and the adjusted size of the frequency-domain resource; and the transmission signal matching the obtained time-domain resource size is generated according to the transport block size matching the obtained time-domain resource size. Accordingly before the transmission signal matching the time-domain resource size obtained in the target sub-frame is generated according to the obtained time-domain resource size, the transport block size index and frequency-domain resource corresponding to the transmission signal in the target sub-frame are further determined.

Here in a particular implementation, the transport block size matching the obtained time-domain resource size can be determined as described in the sixth implementation above, so a repeated description thereof will be omitted here.

In a further particular implementation of the operation 100, a transport block size index is adjusted according to the time-domain resource size obtained in the target sub-frame; a transport block size matching the obtained time-domain resource size is determined according to a size of a frequency-domain resource and the adjusted transport block size index; and the transmission signal matching the obtained time-domain resource size is generated according to the transport block size matching the obtained time-domain resource size. Accordingly before the transmission signal matching the time-domain resource size obtained in the target sub-frame is generated according to the obtained time-domain resource size, the transport block size index and frequency-domain resource corresponding to the transmission signal in the target sub-frame are further determined.

Here in a particular implementation, the transport block size matching the obtained time-domain resource size can be determined as described in the seventh implementation above, so a repeated description thereof will be omitted here.

In a further particular implementation of the operation 100, a transport block size index and a size of a frequency-domain resource are adjusted according to the time-domain resource size obtained in the target sub-frame; a transport block size matching the obtained time-domain resource size is determined according to the adjusted transport block size index and the adjusted size of the frequency-domain resource; and the transmission signal matching the obtained time-domain resource size is generated according to the transport block size matching the obtained time-domain resource size. Accordingly before the transmission signal matching the time-domain resource size obtained in the target sub-frame is generated according to the obtained time-domain resource size, the transport block size index and frequency-domain resource corresponding to the transmission signal in the target sub-frame are further determined.

Here in a particular implementation, the transport block size matching the obtained time-domain resource size can be determined as described in the eighth implementation above, so a repeated description thereof will be omitted here.

In a further particular implementation of the operation 100, a frequency-domain resource matching the time-domain resource size obtained in the target sub-frame (i.e., the frequency-domain resource corresponding to the transmission signal in the target sub-frame) is determined according to the obtained time-domain resource size and a candidate frequency-domain resource; and the transmission signal matching the obtained time-domain resource size is generated according to the frequency-domain resource matching the obtained time-frequency resource size and a transport block size. Accordingly before the transmission signal matching the time-domain resource size obtained in the target sub-frame is generated according to the obtained time-domain resource size, a transport block size index and the candidate frequency-domain resource corresponding to the transmission signal in the target sub-frame are further determined; and the transport block size is determined according to the transport block size index and the candidate frequency-domain resource.

Based on each embodiment above, configuration information (e.g., MCS) of the transport block size index corresponding to the transmission signal, and configuration information of the frequency-domain resource corresponding to the transmission signal are further transmitted. For example, the configuration information can be transmitted over a Physical Downlink Control Channel (PDCCH) or an ePDCCH of a primary carrier, or can be transmitted over an ePDCCH of a secondary carrier in an unlicensed frequency band. It shall be noted that if after the time-frequency resource in the target sub-frame is obtained, the candidate frequency-domain resource is adjusted, and the frequency-domain resource corresponding to the transmission signal is determined, then the abovementioned configuration information cannot be transmitted over the primary carrier.

In order to enable a signal receiver to learn a temporal position where the signal is received, optionally information about a start position and/or an end position of the time-domain resource obtained in the target sub-frame will be transmitted after the time-frequency resource in the target sub-frame is obtained.

Figure 2:
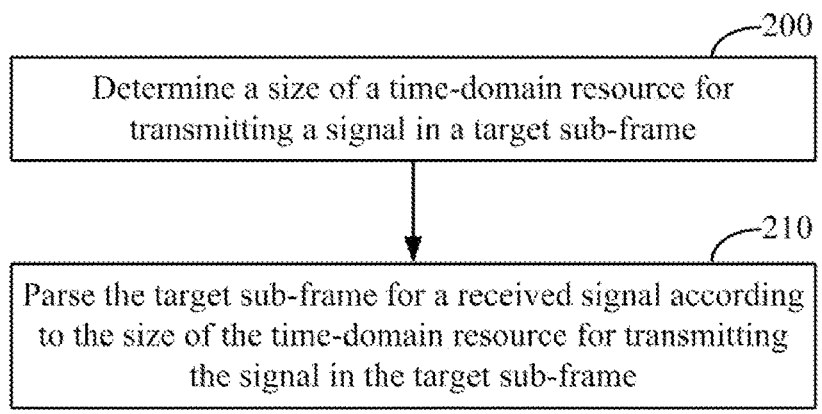
FIG. 2 is a flow chart of a method for receiving a signal according to an embodiment of the disclosure.

FIG. 2 illustrates a method for receiving a signal according to an embodiment of the disclosure, where the method particularly includes the following operations.

The operation 200 is to determine a size of a time-domain resource for transmitting a signal in a target sub-frame; and The operation 210 is to parse the target sub-frame for a received signal according to the size of the time-domain resource for transmitting the signal in the target sub-frame.

In the embodiment of the disclosure, parsing is a reverse process to a transmitter generating a transmission signal. For example, if the transmitter obtains a transmission signal through modulation and encoding, then parsing will be demodulation and decoding of the received signal.

The technical solution according to the embodiment of the disclosure is applicable to transmission of a downlink signal, and accordingly the signal receiver can be a terminal. The technical solution according to the embodiment of the disclosure is also applicable to uplink transmission, and accordingly the signal receiver can be a base station.

In the technical solution according to the embodiment of the disclosure, a size of a time-domain resource for transmitting a signal in a target sub-frame can be determined in the following implementation without any limitation thereto: information about a start position and/or an end position of the time-domain resource for transmitting the transmission signal in the target sub-frame is received, and the size of the time-domain resource for transmitting the signal in the target sub-frame is determined according to the information, where the time-domain resource for transmitting a signal in the target sub-frame is a time-domain resource obtained in the target sub-frame by the transmitter.

Based on any one of the embodiments above of the method for receiving a signal, in a first possible implementation of the operation 210:

The size of a frequency-domain resource is adjusted according to an adjustment coefficient corresponding to a level of the size of the time-domain resource for transmitting the signal in the target sub-frame;

The size of a transport block for transmitting the signal in the target sub-frame is determined according to a transport block size index and the adjusted size of the frequency-domain resource; and The target sub-frame is parsed for the received signal according to the size of the transport block for transmitting the signal in the target sub-frame.

Accordingly before the target sub-frame is parsed for the received signal according to the size of the time-domain resource for transmitting the signal in the target sub-frame, the method further includes:

Configuration information of the transport block size index, and configuration information of the frequency-domain resource, corresponding to the signal in the target sub-frame is received; and the transport block size index of the transport block for transmitting the signal in the target sub-frame is determined according to the configuration information of the transport block size index, and the size of the frequency-domain resource for transmitting the signal in the target sub-frame is determined according to the configuration information of the frequency-domain resource.

Particularly in the implementation above, reference can be made to the description of the embodiments above of the method for transmitting a signal, for the same or corresponding technical features as or to the transmitter, so a repeated description thereof will be omitted here.

Based on any one of the embodiments above of the method for receiving a signal, in a second possible implementation of the operation 210:

A transport block size index is adjusted according to an adjustment coefficient corresponding to the level of the size of the time-domain resource for transmitting the signal in the target sub-frame, and the size of a transport block for transmitting the signal in the target sub-frame is determined according to the size of a frequency-domain resource and the adjusted transport block size index; or the transport block size index and the size of the frequency-domain resource are adjusted according to an adjustment coefficient corresponding to the level of the size of the time-domain resource for transmitting the signal in the target sub-frame, and the size of the transport block for transmitting the signal in the target sub-frame is determined according to the adjusted size of the frequency-domain resource and the adjusted transport block size index; and The target sub-frame is parsed for the received signal according to the size of the transport block for transmitting the signal in the target sub-frame.

Accordingly before the target sub-frame is parsed for the received signal according to the size of the time-domain resource for transmitting the signal in the target sub-frame, the method further includes:

Configuration information of the transport block size index and configuration information of the frequency-domain resource, corresponding to the signal in the target sub-frame is received; and the transport block size index of the transport block for transmitting the signal in the target sub-frame is determined according to the configuration information of the transport block size index, and the size of the frequency-domain resource for the transmission signal in the target sub-frame is determined according to the configuration information of the frequency-domain resource.

Particularly in the implementation above, reference can be made to the description of the embodiments above of the method for transmitting a signal, for the same or corresponding technical features as or to the transmitter, so a repeated description thereof will be omitted here.

Further to any one of the embodiments above of the method for receiving a signal, in a third possible implementation of the operation 210:

The size of a transport block for transmitting a signal in the target sub-frame is determined according to an adjustment coefficient corresponding to a level of the size of the time-domain resource for transmitting the signal in the target sub-frame and a candidate transport block size; and The target sub-frame is parsed for the received signal according to the size of the transport block for transmitting the signal in the target sub-frame.

Accordingly before the target sub-frame is parsed for the received signal according to the size of the time-domain resource for transmitting the signal in the target sub-frame, the method further includes:

Configuration information of the transport block size index, and configuration information of the frequency-domain resource, corresponding to the signal in the target sub-frame is received; the transport block size index of the transport block for transmitting the signal in the target sub-frame is determined according to the configuration information of the transport block size index, and the size of the frequency-domain resource for transmitting the signal in the target sub-frame is determined according to the configuration information of the frequency-domain resource; and the candidate transport block size is determined according to the transport block size index and the size of the frequency-domain resource.

Particularly in the implementation above, reference can be made to the description of the embodiments above of the method for transmitting a signal, for the same or corresponding technical features as or to the transmitter, so a repeated description thereof will be omitted here.

Based on any one of the embodiments above of the method for receiving a signal, in a fourth possible implementation of the operation 210:

The size of a transport block for transmitting the signal in the target sub-frame is determined according to the size of the time-domain resource for transmitting the signal in the target sub-frame and a candidate transport block size; and The target sub-frame is parsed for the received signal according to the size of the transport block for transmitting the signal in the target sub-frame.

Accordingly before the target sub-frame is parsed for the received signal according to the size of the time-domain resource for transmitting the signal in the target sub-frame, the method further includes:

Configuration information of the transport block size index, and configuration information of the frequency-domain resource, corresponding to the signal in the target sub-frame is received; the transport block size index of the transport block for transmitting the signal in the target sub-frame is determined according to the configuration information of the transport block size index, and the size of the frequency-domain resource for transmitting the signal in the target sub-frame is determined according to the configuration information of the frequency-domain resource; and the candidate transport block size is determined according to the transport block size index and the size of the frequency-domain resource.

Particularly in the implementation above, reference can be made to the description of the embodiments above of the method for transmitting a signal, for the same or corresponding technical features as or to the transmitter, so a repeated description thereof will be omitted here.

Based on any one of the embodiments above of the method for receiving a signal, in a fifth possible implementation of the operation 210:

The size of a frequency-domain resource is adjusted according to the size of the time-domain resource for transmitting the signal in the target sub-frame, and the size of a transport block for transmitting the signal in the target sub-frame is determined according to a transport block size index and the adjusted size of the frequency-domain resource; or a transport block size index is adjusted according to the size of the time-domain resource for transmitting the signal in the target sub-frame, and the size of a transport block for transmitting the signal in the target sub-frame is determined according to the size of a frequency-domain resource and the adjusted transport block size index; or a transport block size index and the size of a frequency-domain resource are adjusted according to the size of the time-domain resource for transmitting the signal in the target sub-frame, and the size of a transport block for transmitting the signal in the target sub-frame is determined according to the adjusted transport block size index and the adjusted size of the frequency-domain resource; and The target sub-frame is parsed for the received signal according to the size of the transport block for transmitting the signal in the target sub-frame.

Accordingly before the target sub-frame is parsed for the received signal according to the size of the time-domain resource for transmitting the signal in the target sub-frame, the method further includes:

Configuration information of the transport block size index, and configuration information of the frequency-domain resource, corresponding to the signal in the target sub-frame is received; the transport block size index of the transport block for transmitting the signal in the target sub-frame is determined according to the configuration information of the transport block size index, and the size of the frequency-domain resource for transmitting the signal in the target sub-frame is determined according to the configuration information of the frequency-domain resource.

Particularly in the implementation above, reference can be made to the description of the embodiments above of the method for transmitting a signal, for the same or corresponding technical features as or to the transmitter, so a repeated description thereof will be omitted here.

Further to any one of the embodiments above of the method for receiving a signal, in a sixth possible implementation of the operation 210:

A candidate frequency-domain resource for transmitting the signal in the target sub-frame is determined according to the size of the time-domain resource for transmitting the signal in the target sub-frame and a frequency-domain resource;

The size of a transport block for transmitting the signal in the target sub-frame is determined according to a transport block size index and the candidate frequency-domain resource; and The target sub-frame is parsed for the received signal according to the size of the transport block for transmitting the signal in the target sub-frame.

Accordingly before the target sub-frame is parsed for the received signal according to the size of the time-domain resource for transmitting the signal in the target sub-frame, the method further includes:

Configuration information of the transport block size index and configuration information of the frequency-domain resource, corresponding to the signal in the target sub-frame is received; the transport block size index of the transport block for transmitting the signal in the target sub-frame is determined according to the configuration information of the transport block size index and the size of the frequency-domain resource for transmitting the signal in the target sub-frame is determined according to the configuration information of the frequency-domain resource.

Particularly in the implementation above, reference can be made to the description of the embodiments above of the method for transmitting a signal, for the same or corresponding technical features as or to the transmitter, so a repeated description thereof will be omitted here.

Further to any one of the embodiments above of the method for receiving a signal, preferably the time-domain resource size obtained or the time-domain resource size(s) to be possibly obtained in the target sub-frame is the number of OFDM symbols obtained or to be possibly obtained in the target sub-frame.

Figure 3:
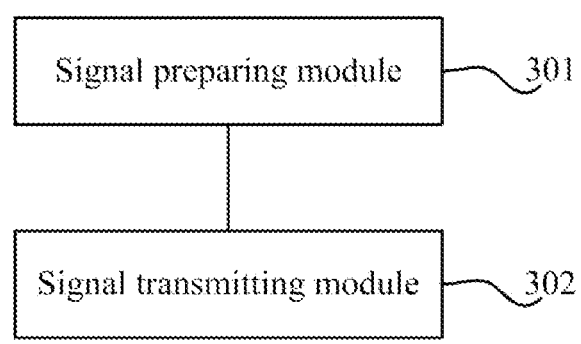
FIG. 3 is a schematic diagram of a device for transmitting a signal according to an embodiment of the disclosure.

Based upon the same inventive idea as the method, an embodiment of the disclosure further provides a device for transmitting a signal as illustrated in FIG. 3, where the device includes:

a signal preparing module 301, configured to generate a transmission signal matching a time-domain resource size obtained in a target sub-frame according to the time-domain resource size obtained in the target sub-frame, or to generate transmission signal(s) matching time-domain resource size(s) to be possibly obtained in a target sub-frame according to the time-domain resource size(s) to be possibly obtained in the target sub-frame; and a signal transmitting module 302, configured to transmit the transmission signal, that matches an obtained time-domain resource in the target sub-frame, after the time-frequency resource in the target sub-frame is obtained.

In an aspect, the signal preparing module 301 is configured:

before the time-frequency resource in the target sub-frame is obtained, to determine transport block size(s) matching the time-domain resource size(s) to be possibly obtained in the target sub-frame, according to the time-domain resource size(s) to be possibly obtained in the target sub-frame; and to generate the transmission signal(s) matching the time-domain resource size(s) according to the transport block size(s) matching the time-domain resource size(s) to be possibly obtained in the target sub-frame.

In a first implementation of the first aspect of the transmitting device, before the transport block size(s) matching the time-domain resource size(s) to be possibly obtained in the target sub-frame is determined according to the time-domain resource size(s) to be possibly obtained in the target sub-frame, the signal preparing module 301 is further configured:

to determine a transport block size index and a frequency-domain resource corresponding to the transmission signal in the target sub-frame.

The signal preparing module 301 configured to determine the transport block size(s) matching the time-domain resource size(s) to be possibly obtained in the target sub-frame, according to the time-domain resource size(s) to be possibly obtained in the target sub-frame is configured:

to adjust the size of the frequency-domain resource according to adjustment coefficient(s) corresponding to the level of each time-domain resource size to be possibly obtained in the target sub-frame, to obtain frequency-domain resource size(s) corresponding to each level; and to determine the transport block size(s) matching the time-domain resource size(s) to be possibly obtained in the target sub-frame at each level according to the transport block size index and the frequency-domain resource size(s) corresponding to each level.

In a second implementation of the first aspect of the transmitting device, before the transport block size(s) matching the time-domain resource size(s) to be possibly obtained in the target sub-frame is determined according to the time-domain resource size(s) to be possibly obtained in the target sub-frame, the signal preparing module 301 is further configured:

to determine a transport block size index and a frequency-domain resource corresponding to the transmission signal in the target sub-frame.

The signal preparing module 301 configured to determine the transport block size(s) matching the time-domain resource size(s) to be possibly obtained in the target sub-frame, according to the time-domain resource size(s) to be possibly obtained in the target sub-frame is configured:

To adjust the transport block size index according to adjustment coefficient(s) corresponding to the level of each time-domain resource size to be possibly obtained in the target sub-frame, to obtain transport block size index(es) corresponding to the each level; and to determine the transport block size(s) matching the time-domain resource size(s) to be possibly obtained in the target sub-frame at each level according to the size of the frequency-domain resource, and the transport block size index(es) corresponding to the each level; or To adjust the transport block size index and the size of the frequency-domain resource according to adjustment coefficient(s) corresponding to the level of each time-domain resource size to be possibly obtained in the target sub-frame, to obtain transport block size index(es) and frequency-domain resource size(s) corresponding to each level; and to determine the transport block size(s) matching the time-domain resource size(s) to be possibly obtained in the target sub-frame at each level according to the transport block size index(es) and the frequency-domain resource size(s) corresponding to each level.

In a third implementation of the first aspect of the transmitting device, before the transport block size(s) matching the time-domain resource size(s) to be possibly obtained in the target sub-frame is determined according to the time-domain resource size(s) to be possibly obtained in the target sub-frame, the signal preparing module 301 is further configured:

to determine a transport block size index and a frequency-domain resource corresponding to the transmission signal in the target sub-frame; and to determine a candidate transport block size according to the transport block size index, and the size of the frequency-domain resource.

The signal preparing module 301 configured to determine the transport block size(s) matching the time-domain resource size(s) to be possibly obtained in the target sub-frame, according to the time-domain resource size(s) to be possibly obtained in the target sub-frame is configured:

To determine the transport block size(s) matching the time-domain resource size(s) to be possibly obtained in the target sub-frame at each level according to adjustment coefficient(s) corresponding to the level of each time-domain resource size to be possibly obtained in the target sub-frame, and the candidate transport block size.

In a fourth implementation of the first aspect of the transmitting device, before the transport block size(s) matching the time-domain resource size(s) to be possibly obtained in the target sub-frame is determined according to the time-domain resource size(s) to be possibly obtained in the target sub-frame, the signal preparing module 301 is further configured:

to determine a transport block size index and a frequency-domain resource corresponding to the transmission signal in the target sub-frame; and to determine a candidate transport block size according to the transport block size index, and the size of the frequency-domain resource.

The signal preparing module 301 configured to determine the transport block size(s) matching the time-domain resource size(s) to be possibly obtained in the target sub-frame, according to the time-domain resource size(s) to be possibly obtained in the target sub-frame is configured:

to determine the transport block size(s) matching each time-domain resource size to be possibly obtained in the target sub-frame according to each time-domain resource size to be possibly obtained in the target sub-frame and the candidate transport block size.

In a fifth implementation of the first aspect of the transmitting device, before the transport block size(s) matching the time-domain resource size(s) to be possibly obtained in the target sub-frame is determined according to the time-domain resource size(s) to be possibly obtained in the target sub-frame, the signal preparing module 301 is further configured:

to determine a transport block size index and a frequency-domain resource corresponding to the transmission signal in the target sub-frame.

The signal preparing module 301 configured to determine the transport block size(s) matching the time-domain resource size(s) to be possibly obtained in the target sub-frame, according to the time-domain resource size(s) to be possibly obtained in the target sub-frame is configured:

to adjust the size of the frequency-domain resource according to each time-domain resource size to be possibly obtained in the target sub-frame; and to determine the transport block size(s) matching each time-domain resource size to be possibly obtained in the target sub-frame according to the transport block size index and the adjusted size(s) of the frequency-domain resource; or to adjust the transport block size index according to each time-domain resource size to be possibly obtained in the target sub-frame; and to determine the transport block size(s) matching each time-domain resource size to be possibly obtained in the target sub-frame according to the size of the frequency-domain resource, and the adjusted transport block size index(es); or to adjust transport block size index, and the size of frequency-domain resource according to each time-domain resource size to be possibly obtained in the target sub-frame; and to determine the transport block size(s) matching each time-domain resource size to be possibly obtained in the target sub-frame according to the adjusted transport block size index(es) and the adjusted size(s) of the frequency-domain resource.

In another aspect, the signal preparing module 301 is configured:

After a time-frequency resource in the target sub-frame is obtained, to generate the transmission signal matching the time-domain resource size obtained in the target sub-frame, according to the time-domain resource size obtained in the target sub-frame.

In a first implementation of the second aspect of the transmitting device, the signal preparing module 301 is configured:

to determine a transport block size index and a frequency-domain resource corresponding to the transmission signal in the target sub-frame;

to adjust the size of the frequency-domain resource according to an adjustment coefficient corresponding to the level of the time-domain resource size obtained in the target sub-frame, and to determine a transport block size matching the obtained time-domain resource size according to the transport block size index and the adjusted size of the frequency-domain resource; or to adjust the transport block size index according to an adjustment coefficient corresponding to the level of the time-domain resource size obtained in the target sub-frame, and to determine a transport block size matching the obtained time-domain resource size according to the adjusted transport block size index and the size of the frequency-domain resource; or to adjust the transport block size index and the size of the frequency-domain resource according to an adjustment coefficient corresponding to the level of the time-domain resource size obtained in the target sub-frame, and to determine a transport block size matching the obtained time-domain resource size according to the adjusted transport block size index, and the adjusted size of the frequency-domain resource; and to generate the transmission signal matching the time-domain resource size obtained in the target sub-frame according to the transport block size matching the time-domain resource size obtained in the target sub-frame.

In a second implementation of the second aspect of the transmitting device, the signal preparing module 301 is configured:

To determine a transport block size index and a frequency-domain resource corresponding to the transmission signal in the target sub-frame; to determine a candidate transport block size according to the transport block size index and the frequency-domain resource; to determine a transport block size matching the obtained time-domain resource size according to an adjustment coefficient corresponding to the level of the time-domain resource size obtained in the target sub-frame, and the candidate transport block size; and to generate the transmission signal matching the time-domain resource size obtained in the target sub-frame according to the transport block size matching the time-domain resource size obtained in the target sub-frame.

In a third implementation of the second aspect of the transmitting device, the signal preparing module 301 is configured:

to determine a transport block size index and a frequency-domain resource corresponding to the transmission signal in the target sub-frame; to determine a candidate transport block size according to the transport block size index and the frequency-domain resource; to determine a transport block size matching the time-domain resource size obtained in the target sub-frame according to the time-domain resource size obtained in the target sub-frame, and the candidate transport block size; and to generate the transmission signal matching the time-domain resource size obtained in the target sub-frame according to the transport block size matching the time-domain resource size obtained in the target sub-frame.

In a fourth implementation of the second aspect of the transmitting device, the signal preparing module 301 is configured:

to determine a transport block size index and a frequency-domain resource corresponding to the transmission signal in the target sub-frame;

to adjust the size of the frequency-domain resource according to the time-domain resource size obtained in the target sub-frame, and to determine a transport block size matching the time-domain resource size obtained in the target sub-frame according to the transport block size index and the adjusted size of the frequency-domain resource; or to adjust the transport block size index according to the time-domain resource size obtained in the target sub-frame, and to determine transport block size matching the time-domain resource size obtained in the target sub-frame according to the size of the frequency-domain resource and the adjusted transport block size index; or to adjust the transport block size index and the size of the frequency-domain resource according to the time-domain resource size obtained in the target sub-frame, and to determine a transport block size matching the time-domain resource size obtained in the target sub-frame according to the adjusted transport block size index, and the adjusted size of the frequency-domain resource; and to generate the transmission signal matching the time-domain resource size obtained in the target sub-frame according to the transport block size matching the time-domain resource size obtained in the target sub-frame.

In a fifth implementation of the second aspect of the transmitting device, the signal preparing module 301 is configured:

to determine a transport block size index and a candidate frequency-domain resource corresponding to the transmission signal in the target sub-frame; to determine a transport block size according to the transport block size index and the candidate frequency-domain resource; to determine a frequency-domain resource matching the time-domain resource size obtained in the target sub-frame according to the time-domain resource size obtained in the target sub-frame, and the candidate frequency-domain resource; and to generate the transmission signal matching the time-domain resource size obtained in the target sub-frame according to the frequency-domain resource matching the time-domain resource size obtained in the target sub-frame and the transport block size.

Based on any one of the embodiments above of the transmitting device, the signal preparing module 301 is further configured:

to transmit configuration information of the determined transport block size index, and configuration information of the determined frequency-domain resource.

Based on any one of the embodiments above of the transmitting device, the signal preparing module 301 is further configured:

after the time-frequency resource in the target sub-frame is obtained, to transmit information about a start position and/or an end position of the time-domain resource obtained in the target sub-frame.

Based on any one of the embodiments above of the transmitting device, the time-domain resource size obtained or the time-domain resource size(s) to be possibly obtained in the target sub-frame is the number of Orthogonal Frequency Division Multiplex (OFDM) symbols.

Figure 4:
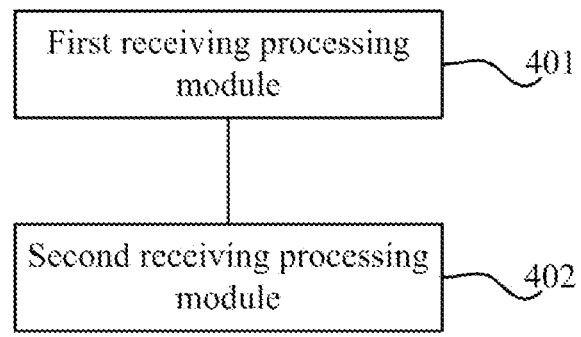
FIG. 4 is a schematic diagram of a device for receiving a signal according to an embodiment of the disclosure.

Based upon the same inventive idea as the method, an embodiment of the disclosure further provides a device for receiving a signal as illustrated in FIG. 4, where the device includes:

a first receiving processing module 401 configured to determine the size of a time-domain resource for transmitting a signal in a target sub-frame; and a second receiving processing module 402 configured to parse the target sub-frame for the received signal according to the size of the time-domain resource for transmitting the signal in the target sub-frame.

Here the first receiving processing module 401 is configured:

to receive information about a start position and/or an end position of the time-domain resource for transmitting the signal in the target sub-frame; and to determine the size of the time-domain resource for transmitting the signal in the target sub-frame according to the information.

Based on the first and second implementations of the device for receiving a signal, the second receiving processing module 402 is configured:

to receive configuration information of a transport block size index, and configuration information of a frequency-domain resource, corresponding to the signal in the target sub-frame; to determine the transport block size index of a transport block for transmitting the signal in the target sub-frame according to the configuration information of the transport block size index, and to determine the size of the frequency-domain resource for transmitting the signal in the target sub-frame according to the configuration information of the frequency-domain resource; to adjust the size of the frequency-domain resource according to an adjustment coefficient corresponding to the level of the size of the time-domain resource for transmitting the signal in the target sub-frame; to determine the size of the transport block for transmitting the signal in the target sub-frame according to the transport block size index, and the adjusted size of the frequency-domain resource; and to parse the target sub-frame for the received signal according to the size of the transport block for transmitting the signal in the target sub-frame.

Based on the first and second implementations of the device for receiving a signal, the second receiving processing module 402 is configured:

to receive configuration information of a transport block size index and configuration information of a frequency-domain resource, corresponding to the signal in the target sub-frame; and to determine the transport block size index of a transport block for transmitting the signal in the target sub-frame according to the configuration information of the transport block size index and to determine the size of the frequency-domain resource for transmitting the signal in the target sub-frame according to the configuration information of the frequency-domain resource;

to adjust the transport block size index according to an adjustment coefficient corresponding to the level of the size of the time-domain resource for transmitting the signal in the target sub-frame, and to determine the size of the transport block for transmitting the signal in the target sub-frame according to the size of the frequency-domain resource, and the adjusted transport block size index; or to adjust the transport block size index and the size of the frequency-domain resource according to an adjustment coefficient corresponding to the level of the size of the time-domain resource for transmitting the signal in the target sub-frame, and to determine the size of the transport block for transmitting the signal in the target sub-frame according to the adjusted size of the frequency-domain resource and the adjusted transport block size index; and to parse the target sub-frame for the received signal according to the transport block size for the transmission signal in the target sub-frame.

Based on the first and second implementations of the device for receiving a signal, the second receiving processing module 402 is configured:

to receive configuration information of a transport block size index and configuration information of a frequency-domain resource, corresponding to the signal in the target sub-frame; to determine the transport block size index of a transport block for transmitting the signal in the target sub-frame according to the configuration information of the transport block size index, and to determine the size of the frequency-domain resource for transmitting the signal in the target sub-frame according to the configuration information of the frequency-domain resource; to determine a candidate transport block size according to the transport block size index and the size of the frequency-domain resource; to determine the size of the transport block for transmitting the signal in the target sub-frame according to an adjustment coefficient corresponding to the level of the size of the time-domain resource for transmitting the signal in the target sub-frame, and the candidate transport block size; and to parse the target sub-frame for the received signal according to the size of the transport block for transmitting the signal in the target sub-frame.

Further to the first and second implementations of the device for receiving a signal, the second receiving processing module 402 is configured:

to receive configuration information of a transport block size index and configuration information of a frequency-domain resource, corresponding to the signal in the target sub-frame; to determine a transport block size index of a transport block for transmitting the signal in the target sub-frame according to the configuration information of the transport block size index, and to determine the size of the frequency-domain resource for transmitting the signal in the target sub-frame according to the configuration information of the frequency-domain resource; to determine a candidate transport block size according to the transport block size index and the size of the frequency-domain resource; to determine the size of the transport block for transmitting the signal in the target sub-frame according to the size of the time-domain resource for transmitting the signal in the target sub-frame and the candidate transport block size; and to parse the target sub-frame for the received signal according to the size of the transport block for transmitting the signal in the target sub-frame.

Further to the first and second implementations of the device for receiving a signal, the second receiving processing module 402 is configured:

to receive configuration information of a transport block size index and configuration information of a frequency-domain resource, corresponding to the signal in the target sub-frame; and to determine the transport block size index of a transport block for transmitting the signal in the target sub-frame according to the configuration information of the transport block size index, and to determine the size of the frequency-domain resource for transmitting the signal in the target sub-frame according to the configuration information of the frequency-domain resource;

to adjust the size of the frequency-domain resource according to the size of the time-domain resource for transmitting the signal in the target sub-frame, and to determine the size of the transport block for transmitting the signal in the target sub-frame according to the transport block size index, and the adjusted size of the frequency-domain resource; or to adjust the transport block size index according to the size of the time-domain resource for transmitting the signal in the target sub-frame, and to determine the size of the transport block for transmitting the signal in the target sub-frame according to the size of the frequency-domain resource, and the adjusted transport block size index; or to adjust the transport block size index, and the size of the frequency-domain resource according to the size of the time-domain resource for transmitting the signal in the target sub-frame, and to determine the size of the transport block for transmitting the signal in the target sub-frame according to the adjusted transport block size index and the adjusted size of the frequency-domain resource; and to parse the target sub-frame for the received signal according to the size of the transport block for the transmitting the signal in the target sub-frame.

Based on the first and second implementations of the device for receiving a signal, the second receiving processing module 402 is configured:

to receive configuration information of a transport block size index, and configuration information of a frequency-domain resource, corresponding to the signal in the target sub-frame; and to determine the transport block size index of a transport block for transmitting the signal in the target sub-frame according to the configuration information of the transport block size index, and to determine the size of the frequency-domain resource for transmitting the signal in the target sub-frame according to the configuration information of the frequency-domain resource; to determine a candidate frequency-domain resource for transmitting the signal in the target sub-frame according to the size of the time-domain resource for transmitting the signal in the target sub-frame, and the frequency-domain resource; to determine the size of the transport block for transmitting the signal in the target sub-frame according to the transport block size index and the candidate frequency-domain resource; and to parse the target sub-frame for the received signal according to the size of the transport block for transmitting the signal in the target sub-frame.

Further to the first and second implementations of the device for receiving a signal, the time-domain resource size obtained or the time-domain resource size(s) to be possibly obtained in the target sub-frame is the number of Orthogonal Frequency Division Multiplex (OFDM) symbol(s) obtained or to be possibly obtained in the target sub-frame.

Figure 5:
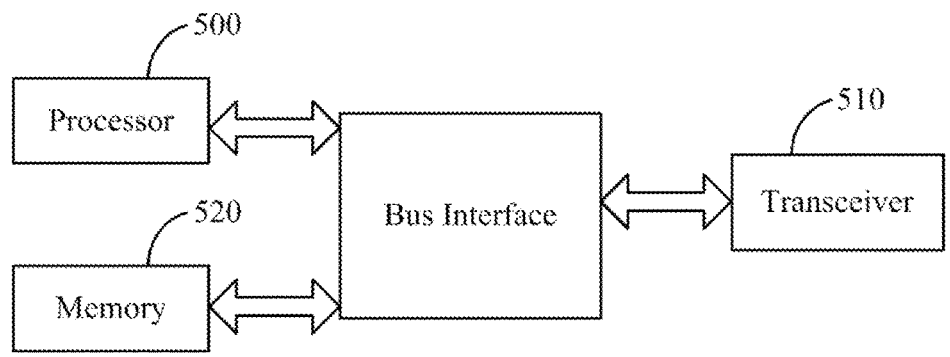
FIG. 5 is a schematic structural diagram of a base station according to an embodiment of the disclosure.

Based upon the same inventive idea as the method, an embodiment of the disclosure provides a base station as illustrated in FIG. 5, which includes:

a processor 500, a transceiver 510, and a memory 520, where:

the processor 500 is configured to read a program in the memory 520, and to perform the process of each embodiment of the method above for transmitting a signal, and/or to perform the process of each embodiment of the method above for receiving a signal;

the transceiver 510 is configured to be controlled by the processor 500 to transmit and receive data; and the memory 520 is configured to store data to be used by the processor 500 in operation.

Here in FIG. 5, the bus architecture can include any number of interconnecting buses and bridges to particularly link together various circuits including one or more processors represented by the processor 500, and one or more memories represented by the memory 520. The bus architecture can further link together various other circuits, e.g., prophetical devices, voltage stabilizers, power management circuits, and etc., all of which are well known in the art, so a further description thereof will be omitted in this context. A bus interface serves as an interface. The transceiver 510 can be a plurality of elements including a transmitter and a receiver which are units for communication with various other devices over a transmission medium. The processor 500 is responsible for managing the bus architecture and performing normal processes, and the memory 520 can store data to be used by the processor 500 when performing the operations.

Figure 6:
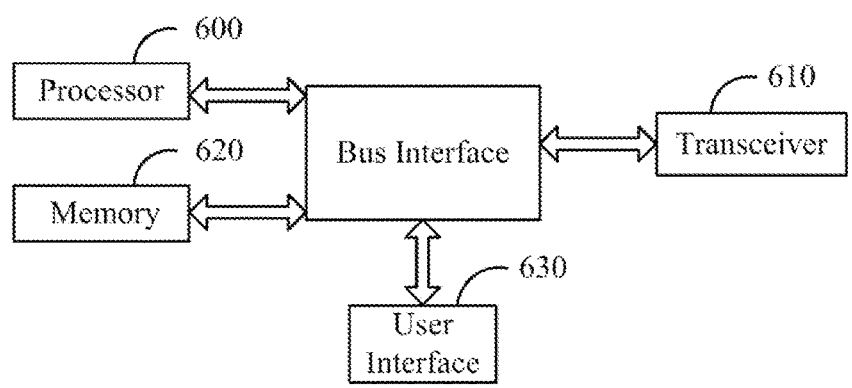
FIG. 6 is a schematic structural diagram of a terminal according to an embodiment of the disclosure.

Based upon the same inventive idea as the method, an embodiment of the disclosure provides a base station as illustrated in FIG. 6, which includes:

a processor 600, a transceiver 610, and a memory 620, where:

the processor 600 is configured to read a program in the memory 620, and to perform the process of each embodiment of the method above for receiving a signal, and/or to perform the process of each embodiment of the method above for transmitting a signal;

the transceiver 610 is configured to be controlled by the processor 600 to transmit and receive data; and the memory 620 is configured to store data to be used by the processor 600 in operation.

Here the processor of the terminal may not perform the process of transmitting the configuration information of the transport block size index, and the configuration information of the frequency-domain resource.

Here in FIG. 6, the bus architecture can include any number of interconnecting buses and bridges to particularly link together various circuits including one or more processors represented by the processor 600, and one or more memories represented by the memory 620. The bus architecture can further link together various other circuits, e.g., prophetical devices, voltage stabilizers, power management circuits, and etc., all of which are well known in the art, so a further description thereof will be omitted in this context. A bus interface serves as an interface. The transceiver 610 can be a plurality of elements including a transmitter and a receiver which are units for communication with various other devices over a transmission medium. For different user equipment, the user interface 630 can also be an interface via which external or internal devices can be connected as appropriate, where the connected devices include but will not be limited to a keypad, a display, a speaker, a microphone, a joystick, and etc.

The processor 600 is responsible for managing the bus architecture and performing normal processes, and the memory 620 can store data to be used by the processor 600 when performing the operations.

The technical solutions according to the embodiments of the disclosure are applicable to signal transmission in a partial sub-frame in an unlicensed frequency band, but will not be limited thereto. For example, they are applicable to an LTE-U system operating in the LBE access mechanism, but also can be applicable to an LTE-U system operating in the FBE access mechanism. It shall be noted that the technical solutions according to the embodiments of the disclosure can be applicable to signal transmission as long as there is signal transmission in a partial sub-frame, and especially neither whether a target sub-frame can be occupied successfully, nor a time-domain resource size to be occupied in the target sub-frame can be foreknown.

The respective embodiments above have been described above respectively from the perspectives of the signal transmitter and the signal receiver. It shall be noted that those skilled in the art can derive implementations in which the signal transmitter and the signal receiver cooperate with each other, directly and definitely from the solutions according to the embodiments of the disclosure. Accordingly the implementations in which the signal transmitter and the signal receiver cooperate with each other shall also fall into the scope of the disclosure as claimed.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method comprising:
generating, by a processor, a transmission signal having a size matching a size of a time-domain resource according to the size of the time-domain resource,
wherein the time-domain resource is a time-domain resource obtained in a target sub-frame or is a time-domain to be possibly obtained in the target sub-frame; and
transmitting, by the processor, the transmission signal, having the size matching the size of the time-domain resource obtained in the target sub-frame,
after a time-frequency resource in the target sub-frame is obtained;
wherein
the target sub-frame is a partial sub-frame;
generating the transmission signal having the size matching the size of the time-domain resource to be possibly obtained in the target sub-frame according to the size of the time-domain resource to be possibly obtained in the target sub-frame comprises:
determining a transport block size matching the size of the time-domain resource to be possibly obtained in the target sub-frame,
according to the size of the time-domain resource to be possibly obtained in the target sub-frame, before the time-frequency resource in the target sub-frame is obtained; and,
generating the transmission signal having the size matching the size of the time-domain resource to be possibly obtained in the target sub-frame according to the transport block size matching the size of the time-domain resource to be possibly obtained in the target sub-frame.

2. The method according to claim 1, before the transport block size matching the size of the time-domain resource to be possibly obtained in the target sub-frame is determined according to the size of the time-domain resource to be possibly obtained in the target sub-frame, further comprising:
determining a transport block size index and a frequency-domain resource corresponding to the transmission signal; and
determining the transport block size matching the size of the time-domain resource to be possibly obtained in the target sub-frame, according to the size of the time-domain resource to be possibly obtained in the target sub-frame comprises:
adjusting a size of the frequency-domain resource according to an adjustment coefficient corresponding to a level of the size of the time-domain resource to be possibly obtained in the target sub-frame, to obtain a frequency-domain resource size corresponding to the level; and determining the transport block size matching the size of the time-domain resource to be possibly obtained in the target sub-frame according to the transport block size index and according to the frequency-domain resource size corresponding to the level; or
adjusting the transport block size index according to an adjustment coefficient corresponding to the level of the size of the time-domain resource to be possibly obtained in the target sub-frame, to obtain a transport block size index corresponding to the level; and determining the transport block size matching the size of the time-domain resource to be possibly obtained in the target sub-frame according to the size of the frequency-domain resource, and according to the transport block size index corresponding to the level; or
adjusting the transport block size index and the size of the frequency-domain resource according to an adjustment coefficient corresponding to the level of the size of the time-domain resource to be possibly obtained in the target sub-frame, to obtain the transport block size index corresponding to the level and to obtain the frequency-domain resource size corresponding to the level; and determining the transport block size matching the size of the time-domain resource to be possibly obtained in the target sub-frame according to the transport block size index corresponding to the level and according to the frequency-domain resource size corresponding to the level.

3. The method according to claim 1, before the transport block size matching the size of the time-domain resource to be possibly obtained in the target sub-frame is determined according to the size of the time-domain resource to be possibly obtained in the target sub-frame, further comprising:
determining a transport block size index and a frequency-domain resource corresponding to the transmission signal; and determining a candidate transport block size according to the transport block size index and a size of the frequency-domain resource; and
determining the transport block size matching the size of the time-domain resource to be possibly obtained in the target sub-frame, according to the size of the time-domain resource to be possibly obtained in the target sub-frame comprises:

determining the transport block size matching the size of the time-domain resource to be possibly obtained in the target sub-frame according to an adjustment coefficient corresponding to a level of the size of the time-domain resource to be possibly obtained in the target sub-frame, and according to the candidate transport block size; or determining the transport block size matching the size of the time-domain resource to be possibly obtained in the target sub-frame according to the size of the time-domain resource to be possibly obtained in the target sub-frame and according to the candidate transport block size.

4. The method according to claim 1, before the transport block size matching the size of the time-domain resource to be possibly obtained in the target sub-frame is determined according to the size of the time-domain resource to be possibly obtained in the target sub-frame, further comprising:

determining a transport block size index and a frequency-domain resource corresponding to the transmission signal; and determining the transport block size matching the size of the time-domain resource to be possibly obtained in the target sub-frame, according to the size of the time-domain resource to be possibly obtained in the target sub-frame comprises:

adjusting a size of the frequency-domain resource according to the size of the time-domain resource to be possibly obtained in the target sub-frame; and determining the transport block size matching the size of the time-domain resource to be possibly obtained in the target sub-frame according to the transport block size index and according to the adjusted size of the frequency-domain resource; or adjusting the transport block size index according to the size of the time-domain resource to be possibly obtained in the target sub-frame; and determining the transport block size matching the size of the time-domain resource to be possibly obtained in the target sub-frame according to the size of the frequency-domain resource, and according to the adjusted transport block size index; or adjusting the transport block size index and the size of the frequency-domain resource according to the size of the time-domain resource to be possibly obtained in the target sub-frame; and determining the transport block size matching the size of the time-domain resource to be possibly obtained in the target sub-frame according to the adjusted transport block size index and according to the adjusted size of the frequency-domain resource.

5. The method according to claim 1, wherein generating the transmission signal having the size matching the size of the time-domain resource obtained in the target sub-frame according to the size of the time-domain resource obtained in the target sub-frame comprises:

after the time-frequency resource in the target sub-frame is obtained, generating the transmission signal, having the size matching the size of the time-domain resource obtained in the target sub-frame, according to the size of the time-domain resource obtained in the target sub-frame.

6. The method according to claim 5, wherein before the transmission signal, having the size matching the size of the time-domain resource obtained in the target sub-frame, is generated according to the size of the time-domain resource obtained in the target sub-frame, further comprising:

determining a transport block size index and a frequency-domain resource corresponding to the transmission signal; and generating the transmission signal, having the size matching the size of the time-domain resource obtained in the target sub-frame, according to the size of the time-domain resource obtained in the target sub-frame comprises:

adjusting a size of the frequency-domain resource according to an adjustment coefficient corresponding to a level of the size of the time-domain resource obtained in the target sub-frame, and determining a transport block size matching the size of the obtained time-domain resource according to the transport block size index, and according to the adjusted size of the frequency-domain resource; or adjusting the transport block size index according to an adjustment coefficient corresponding to the level of the size of the time-domain resource obtained in the target sub-frame, and determining the transport block size matching the size of the obtained time-domain resource according to the adjusted transport block size index, and according to the size of the frequency-domain resource; or adjusting the transport block size index and the size of the frequency-domain resource according to an adjustment coefficient corresponding to the level of the size of the time-domain resource obtained in the target sub-frame, and determining the transport block size matching the size of the obtained time-domain resource according to the adjusted transport block size index, and according to the adjusted size of the frequency-domain resource; or adjusting the size of the frequency-domain resource according to the size of the time-domain resource obtained in the target sub-frame, and determining the transport block size matching the size of the time-domain resource obtained in the target sub-frame according to the transport block size index, and according to the adjusted size of the frequency-domain resource; or adjusting the transport block size index according to the size of the time-domain resource obtained in the target sub-frame, and determining the transport block size matching the size of the time-domain resource obtained in the target sub-frame according to the size of the frequency-domain resource and according to the adjusted transport block size index; or adjusting the transport block size index, and the size of the frequency-domain resource according to the size of the time-domain resource obtained in the target sub-frame, and determining the transport block size matching the size of the time-domain resource obtained in the target sub-frame according to the adjusted transport block size index, and according to the adjusted size of the frequency-domain resource; and generating the transmission signal, having the size matching the size of the time-domain resource obtained in the target sub-frame, according to the transport block size matching the size of the time-domain resource obtained in the target sub-frame.

7. The method according to claim 5, wherein before the transmission signal having the size matching the size of the time-domain resource obtained in the target sub-frame is generated according to the size of the time-domain resource obtained in the target sub-frame, further comprising:

determining a transport block size index and a frequency-domain resource corresponding to the transmission signal; and determining a candidate transport block size according to the transport block size index and according to the frequency-domain resource;

generating the transmission signal, having the size matching the size of the time-domain resource obtained in the target sub-frame, according to the size of the time-domain resource obtained in the target sub-frame comprises:

determining a transport block size matching the size of the obtained time-domain resource according to an adjustment coefficient corresponding to a level of the size of the time-domain resource obtained in the target sub-frame, and according to the candidate transport block size; or determining the transport block size matching the size of the time-domain resource obtained in the target sub-frame according to the size of the time-domain resource obtained in the target sub-frame, and according to the candidate transport block size; and generating the transmission signal, having the size matching the size of the time-domain resource obtained in the target sub-frame, according to the transport block size matching the size of the time-domain resource obtained in the target sub-frame.

8. The method according to claim 5, before the transmission signal, having the size matching the size of the time-domain resource obtained in the target sub-frame, is generated according to the size of the time-domain resource obtained in the target sub-frame, further comprising:

determining a transport block size index and a candidate frequency-domain resource corresponding to the transmission signal; and determining a transport block size according to the transport block size index and according to the candidate frequency-domain resource; and generating the transmission signal, matching the size of the time-domain resource obtained in the target sub-frame, according to the size of the time-domain resource obtained in the target sub-frame comprises:

determining a frequency-domain resource matching the size of the time-domain resource obtained in the target sub-frame according to the size of the time-domain resource obtained in the target sub-frame, and according to the candidate frequency-domain resource; and generating the transmission signal, having the size matching the size of the time-domain resource obtained in the target sub-frame, according to the frequency-domain resource matching the size of the time-domain resource obtained in the target sub-frame and according to the transport block size.

9. The method according to claim 2, wherein the method further comprises:

transmitting configuration information of the determined transport block size index and configuration information of the determined frequency-domain resource.

10. The method according to claim 1, further comprising:
after the time-frequency resource in the target sub-frame is obtained, transmitting information about a start position and/or an end position of the time-domain resource obtained in the target sub-frame.

11. The method according to claim 1, further comprising:
the size of the time-domain resource obtained in the target sub-frame is the number of Orthogonal Frequency Division Multiplex (OFDM) symbols obtained in the target sub-frame, or, the size of the time-domain resource to be possibly obtained in the target sub-frame is the number of OFDM symbols to be possibly obtained in the target sub-frame.

12. A method comprising:
determining, by a processor, a size of a time-domain resource for transmitting a signal in a target sub-frame, wherein the target sub-frame is a partial sub-frame; and parsing, by the processor, a signal received in the target sub-frame according to the size of the time-domain resource for transmitting the signal in the target sub-frame;

wherein the signal is generated by:
before a time-frequency resource in the target sub-frame is obtained, d determining a transport block size matching a size of a time-domain resource to be possibly obtained in the target sub-frame, according to the size of the time-domain resource to be possibly obtained in the target sub-frame; and, generating the signal, having a size matching the size of the time-domain resource to be possibly obtained in the target sub-frame according to the transport block size matching the size of the time-domain resource to be possibly obtained in the target sub-frame.

13. The method according to claim 12, wherein determining the size of the time-domain resource for transmitting the signal in the target sub-frame comprises:

receiving information about a start position and/or an end position of the time-domain resource for transmitting the signal in the target sub-frame, and determining the size of the time-domain resource for transmitting the signal in the target sub-frame according to the information.

14. The method according to claim 12, before the signal received in the target sub-frame is parsed according to the size of the time-domain resource for transmitting the signal in the target sub-frame, further comprising:

receiving configuration information of a transport block size index corresponding to the signal in the target sub-frame, and receiving configuration information of a frequency-domain resource corresponding to the signal in the target sub-frame; and determining the transport block size index of a transport block for transmitting the signal in the target sub-frame according to the configuration information of the transport block size index, and determining a size of the frequency-domain resource for transmitting the signal in the target sub-frame according to the configuration information of the frequency-domain resource; and parsing the signal received in the target sub-frame according to the size of the time-domain resource for the transmitting the signal in the target sub-frame comprises:

adjusting the size of the frequency-domain resource according to an adjustment coefficient corresponding to a level of the size of the time-domain resource for transmitting the signal in the target sub-frame, and determining the size of the transport block for transmitting the signal in the target sub-frame according to the transport block size index and according to the adjusted size of the frequency-domain resource; or adjusting the transport block size index according to an adjustment coefficient corresponding to the level of the size of the time-domain resource for transmitting the signal in the target sub-frame, and determining the size of the transport block for transmitting the signal in the target sub-frame according to the size of the frequency-domain resource and according to the adjusted transport block size index; or adjusting the transport block size index and the size of the frequency-domain resource according to an adjustment coefficient corresponding to the level of the size of the time-domain resource for transmitting the signal in the target sub-frame, and determining the size of the transport block for transmitting the signal in the target sub-frame according to the adjusted size of the frequency-domain resource and according to the adjusted transport block size index; or adjusting the size of the frequency-domain resource according to the size of the time-domain resource for transmitting the signal in the target sub-frame, and determining the size of the transport block for transmitting the signal in the target sub-frame according to the transport block size index, and according to the adjusted size of the frequency-domain resource; or adjusting the transport block size index according to the size of the time-domain resource for transmitting the signal in the target sub-frame, and determining the size of the transport block for transmitting the signal in the target sub-frame according to the size of the frequency-domain resource and according to the adjusted transport block size index; or adjusting the transport block size index and the size of the frequency-domain resource according to the size of the time-domain resource for transmitting the signal in the target sub-frame, and determining the size of the transport block for transmitting the signal in the target sub-frame according to the adjusted transport block size index and according to the adjusted size of the frequency-domain resource;

and parsing the signal received in the target sub-frame according to the size of the transport block for transmitting the signal in the target sub-frame.

15. The method according to claim 12, before the signal received in the target sub-frame is parsed according to the size of the time-domain resource for transmitting the signal in the target sub-frame, further comprising:

receiving configuration information of a transport block size index corresponding to the signal in the target sub-frame, and receiving configuration information of a frequency-domain resource corresponding to the signal in the target sub-frame; and determining the transport block size index of a transport block for transmitting the signal in the target sub-frame according to the configuration information of the transport block size index, determining a size of the frequency-domain resource for transmitting the signal in the target sub-frame according to the configuration information of the frequency-domain resource; and determining a candidate transport block size according to the transport block size index and the size of the frequency-domain resource;

parsing the signal received in the target sub-frame according to the size of the time-domain resource for transmitting the signal in the target sub-frame comprises:

determining a size of a transport block for transmitting the signal in the target sub-frame according to an adjustment coefficient corresponding to a level of the size of the time-domain resource for transmitting the signal in the target sub-frame, and according to the candidate transport block size; or determining the size of the transport block for transmitting the signal in the target sub-frame according to the level of the size of the time-domain resource for transmitting the signal in the target sub-frame, and according to the candidate transport block size; and parsing the signal received in the target sub-frame according to the size of the transport block for transmitting the signal in the target sub-frame.

16. The method according to claim 12, before the signal received in the target sub-frame is parsed according to the size of the time-domain resource for transmitting the signal in the target sub-frame, further comprising:

receiving configuration information of a transport block size index corresponding to the signal in the target sub-frame, and receiving configuration information of a frequency-domain resource corresponding to the signal in the target sub-frame; and determining the transport block size index of a transport block for transmitting the signal in the target sub-frame according to the configuration information of the transport block size index, and determining a size of the frequency-domain resource for transmitting the signal in the target sub-frame according to the configuration information of the frequency-domain resource; and parsing the signal received in the target sub-frame according to the size of the time-domain resource for transmitting the signal in the target sub-frame comprises:

determining a candidate frequency-domain resource for transmitting the signal in the target sub-frame according to the size of the time-domain resource for transmitting the signal in the target sub-frame, and according to the frequency-domain resource;

determining a size of a transport block for transmitting the signal in the target sub-frame according to the transport block size index and according to the candidate frequency-domain resource; and parsing the signal received in the target sub-frame according to the size of the transport block for transmitting the signal in the target sub-frame.

17. A device for transmitting a signal, comprising:

a transceiver;

a memory, configured to store at least one instruction;

a processor, configured to execute the at least one instruction to:

generate a transmission signal having a size matching a size of a time-domain resource according to the size of the time-domain resource size wherein the time-domain resource is a time-domain resource obtained in a target sub-frame or is a time-domain to be possibly obtained in the target sub-frame; and control the transceiver to transmit the transmission signal, having the size matching the size of the time-domain resource obtained in the target sub-frame, after a time-frequency resource in the target sub-frame is obtained;

wherein the target sub-frame is a partial sub-frame;

the processor is further configured to execute the at least one instruction to:

determine a transport block size matching the size of the time-domain resource to be possibly obtained in the target sub-frame, according to the size of the time-domain resource to be possibly obtained in the target sub-frame, before the time-frequency resource in the target sub-frame is obtained; and, generate the transmission signal having the size matching the size of the time-domain resource to be possibly obtained in the target sub-frame according to the transport block size matching the size of the time-domain resource to be possibly obtained in the target sub-frame.

18. A device for receiving a signal, the device comprising:
a transceiver, configured to receive a signal in a target sub-frame;
a memory, configured to store at least one instruction;
a processor, configured to execute the at least one instruction to:
determine a size of a time-domain resource for transmitting the signal in the target sub-frame, wherein the target sub-frame is a partial sub-frame; and
parse the signal received in the target sub-frame according to the size of the time-domain resource for transmitting the signal in the target sub-frame;
wherein the signal is generated by:
before a time-frequency resource in the target sub-frame is obtained,
determining a transport block size matching a size of a time-domain resource to be possibly obtained in the target sub-frame,
according to the size of the time-domain resource to be possibly obtained in the target sub-frame; and,
generating the signal, having a size matching the size of the time-domain resource to be possibly obtained in the target sub-frame according to the transport block size matching the size of the time-domain resource to be possibly obtained in the target sub-frame.

19. The device according to claim 18, wherein the processor is further configured to execute the at least one instruction to:

control the transceiver to receive configuration information of a transport block size index corresponding to the signal in the target sub-frame, and control the transceiver to configuration information of a frequency-domain resource corresponding to the signal in the target sub-frame; and determine the transport block size index of the transport block for transmitting the signal in the target sub-frame according to the configuration information of the transport block size index, and determine a size of the frequency-domain resource for transmitting the signal in the target sub-frame according to the configuration information of the frequency-domain resource;

adjust the size of the frequency-domain resource according to an adjustment coefficient corresponding to a level of the size of the time-domain resource size for transmitting the signal in the target sub-frame;

determine the size of the transport block for transmitting the signal in the target sub-frame according to the transport block size index, and according to the adjusted size of the frequency-domain resource; and parse the signal received in the target sub-frame according to the size of the transport block for transmitting the signal in the target sub-frame.

* * * * *